United States Patent
Li et al.

(10) Patent No.: US 11,425,414 B2
(45) Date of Patent: Aug. 23, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/941,286

(22) Filed: Jul. 28, 2020

(65) Prior Publication Data

US 2021/0044824 A1 Feb. 11, 2021

Related U.S. Application Data

(60) Provisional application No. 62/883,084, filed on Aug. 5, 2019.

(51) Int. Cl.
*H04B 1/66* (2006.01)
*H04N 7/12* (2006.01)
(Continued)

(52) U.S. Cl.
CPC ............. *H04N 19/52* (2014.11); *H04N 19/13* (2014.11); *H04N 19/184* (2014.11); *H04N 19/96* (2014.11)

(58) Field of Classification Search
CPC .............................. H04N 19/523; H04N 19/13
See application file for complete search history.

(56) References Cited

U.S. PATENT DOCUMENTS

| 10,531,116 | B2* | 1/2020 | Li | H04N 19/109 |
|---|---|---|---|---|
| 2013/0114675 | A1* | 5/2013 | Guo | H04N 19/13 |
| | | | | 375/240.02 |

(Continued)

FOREIGN PATENT DOCUMENTS

| WO | WO-2019069902 A1 * | 4/2019 | ............. H04N 19/13 |
|---|---|---|---|
| WO | WO-2020182965 A1 * | 9/2020 | ........... H04N 19/117 |

(Continued)

OTHER PUBLICATIONS

Benjamin Bross et al., Versatile Video Coding (Draft 6), Document: JVET-O2001-vE, Jul. 3-12, 2019, 456 pages.
(Continued)

*Primary Examiner* — Fabio S Lima
(74) *Attorney, Agent, or Firm* — ArentFox Schiff LLP

(57) ABSTRACT

Aspects of the disclosure provide methods and an apparatus for video coding. The apparatus includes processing circuitry that decodes coding information of a current block from a coded video bitstream. The coding information can indicate an inter merge mode for the current block. The processing circuitry can prune, for the current block, a merge candidate list including at least one merge candidate based on motion information and a flag associated with each of the at least one merge candidate. Each of the at least one merge candidate can be of a respective neighboring block of the current block. The flag can indicate whether an alternative half pixel (half-Pel) interpolation filter (IF) is used for the respective neighboring block. The processing circuitry can reconstruct a sample in the current block based on one of the at least one merge candidate.

15 Claims, 15 Drawing Sheets

(51) Int. Cl.
*H04N 11/02* (2006.01)
*H04N 11/04* (2006.01)
*H04N 19/52* (2014.01)
*H04N 19/184* (2014.01)
*H04N 19/13* (2014.01)
H04N 19/96 (2014.01)

(56) References Cited

U.S. PATENT DOCUMENTS

| | | | |
|---|---|---|---|
| 2020/0366924 A1* | 11/2020 | Rusanovskyy | H04N 19/52 |
| 2020/0413078 A1* | 12/2020 | Li | H04N 19/523 |
| 2021/0076062 A1* | 3/2021 | Jang | H04N 19/159 |
| 2021/0195227 A1* | 6/2021 | Lee | H04N 19/55 |

FOREIGN PATENT DOCUMENTS

| | | | | |
|---|---|---|---|---|
| WO | WO-2020256329 A1 * | 12/2020 | | H04N 19/132 |
| WO | WO-2020264457 A1 * | 12/2020 | | H04N 19/176 |

OTHER PUBLICATIONS

International Telecommunication Union (ITU), Series H: Audiovisual and Multimedia Systems Infrastructure of audiovisual services—Coding of moving video; ITU-T, H.265 v4, Dec. 2016, 664 pages.

* cited by examiner

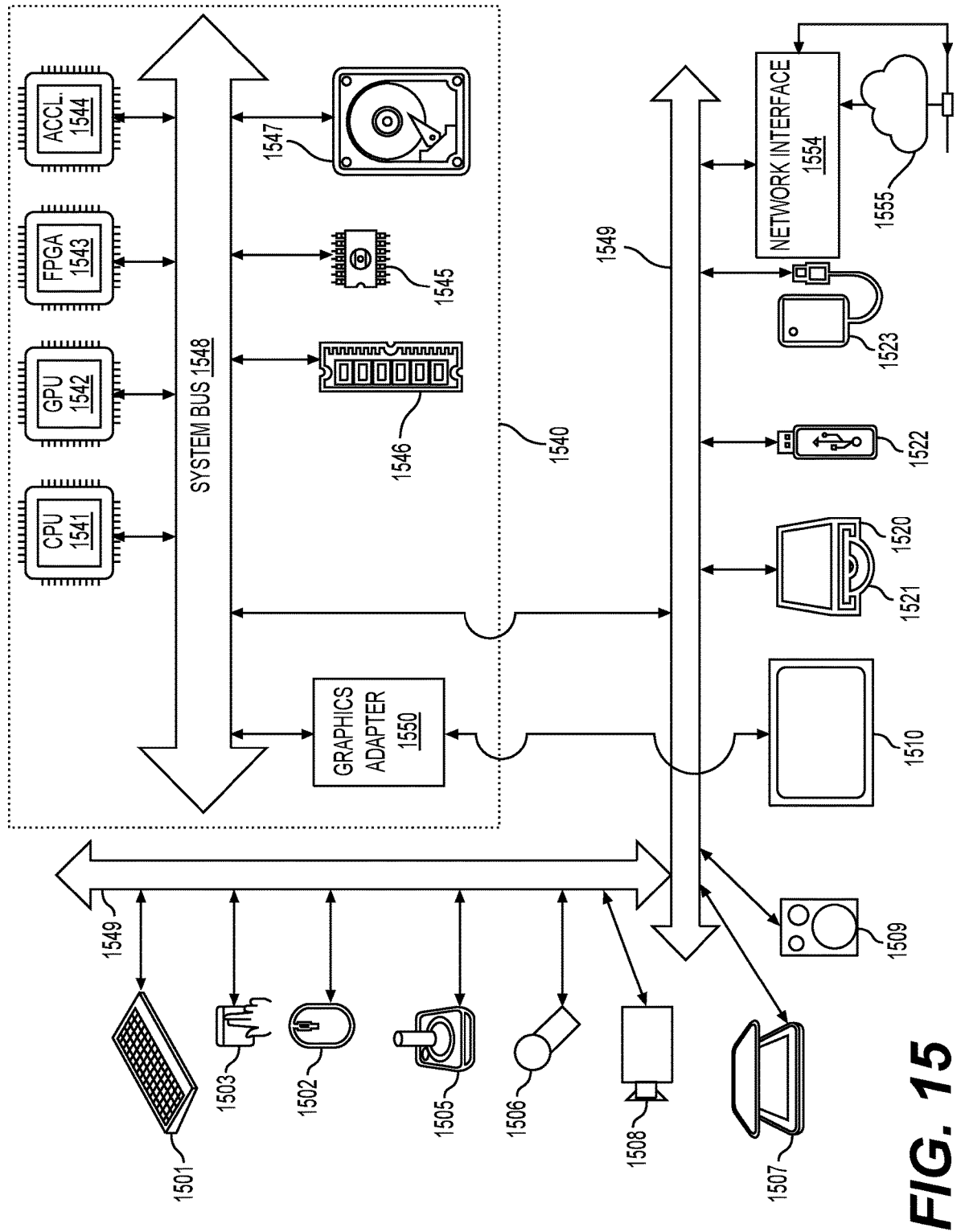

METHOD AND APPARATUS FOR VIDEO CODING

INCORPORATION BY REFERENCE

This present disclosure claims the benefit of priority to U.S. Provisional Application No. 62/883,084, "Methods on Adaptive Motion Vector Resolution" filed on Aug. 5, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can be configured to decode coding information of a current block from a coded video bitstream. The coding information can indicate an inter merge mode for the current block. The processing circuitry can prune, for the current block, a merge candidate list including at least one merge candidate based on motion information and a flag associated with each of the at least one merge candidate. Each of the at least one merge candidate can be of a respective neighboring block of the current block. The flag can indicate whether an alternative half pixel (half-Pel) interpolation filter (IF) is used for the respective neighboring block. The processing circuitry can reconstruct a sample in the current block based on one of the at least one merge candidate.

In an embodiment, the at least one merge candidate includes a first candidate and a second candidate. The first candidate can include first motion information and a first flag of a first neighboring block. The second candidate can include second motion information and a second flag of a second neighboring block. The first neighboring block and the second neighboring block can be neighboring blocks of the current block. The first flag and the second flag can indicate whether the alternative half-Pel IF is used for the first neighboring block and the second neighboring block, respectively. The processing circuitry can prune the merge candidate list based on the first motion information, the second motion information, the first flag, and the second flag.

In an embodiment, the motion information includes a motion vector and a corresponding reference picture for the neighboring block of the current block.

Aspects of the disclosure provide methods and apparatuses for video encoding/decoding. In some examples, an apparatus for video decoding includes processing circuitry. The processing circuitry can be configured to decode coding information of a current block in a current picture from a coded video bitstream. The coding information can include a flag indicating whether a half pixel (half-Pel) precision is used for a component of a motion vector difference (MVD) of the current block. The processing circuitry can determine a value of the flag based on one of: (i) at least one of a first flag and a second flag, (ii) a temporal layer identification (ID) of the current picture in a temporal layer, and (iii) block size information of the current block. The first flag can indicate whether an alternative half-pixel (half-Pel) interpolation filter (IF) is used for a left neighboring block of the current block, and the second flag can indicate whether the alternative half-Pel IF is used for a top neighboring block of the current block. In response to the value of the flag indicating that the half-Pel precision is used for the component of the MVD, the processing circuitry can determine a motion vector (MV) for the current block using the half-Pel precision and reconstruct a sample in the current block based on the MV.

In an example, the processing circuitry can determine, based on the at least one of the first flag and the second flag, a context model from context models in a context-adaptive binary arithmetic coding (CABAC). The processing circuitry can determine the value of the flag using the CABAC with the determined context model.

In an example, the processing circuitry can determine, based on the at least one of the first flag and the second flag, whether to use a context model in a CABAC. In response to a determination to use the context model, the processing circuitry can determine the value of the flag using the CABAC with the context model. In response to a determination not to use the context model, the processing circuitry can determine the value of the flag using a bypass coding mode.

In an example, the processing circuitry can determine, based on the temporal layer ID of the current picture, a context model to be used in a CABAC. The processing circuitry can determine the value of the flag using the CABAC with the determined context model.

The context model is one of one or more context models in the CABAC. The temporal layer ID is one of one or more temporal layer IDs for respective one or more temporal layers that are allowed for the current picture. The temporal layer ID corresponds to the determined context model.

In an example, the processing circuitry can determine the context model from two context models in the CABAC based on the temporal layer ID and a threshold.

In an example, the processing circuitry can determine the context model from N context models in the CABAC based on the temporal layer ID and (N−1) thresholds. N is less than a maximum number of allowable temporal layers having temporal layer IDs that include the temporal layer ID.

In an example, the processing circuitry can determine, based on the block size information of the current block and a threshold, a context model from two context models in a CABAC. The processing circuitry can determine the value of the flag using the CABAC with the determined context model.

The method of claim 11, wherein the block size information of the current block indicates at least one of (i) a width of the current block, (ii) a height of the current block, and (iii) a number of luma samples in the current block.

In an example, multiple precisions available to be used for the component of the MVD of the current block include a quarter-pixel (¼-Pel) precision, the ½-Pel precision, a one-pixel (1-Pel) precision, and a four-pixel (4-Pel) precision. The flag indicating whether the ½-Pel precision is used is signaled after a flag that indicates whether the 1-Pel precision is used and after a flag that indicates whether the ¼-Pel precision is used.

In an example, multiple precisions available to be used for the component of the MVD of the current block include a ¼-Pel precision, the ½-Pel precision, a 1-Pel precision, and a 4-Pel precision. The flag indicating whether the ½-Pel precision is used is signaled before a flag that indicates whether the 4-Pel precision or the 1-Pel precision is used. A value of the flag that indicates whether the 4-Pel precision or the 1-Pel precision is used being 0 indicates that the 4-Pel precision is used. The value of the flag that indicates whether the 4-Pel precision or the 1-Pel precision is used being 1 indicates that the 1-Pel precision is used.

In an example, multiple precisions available to be used for the component of the MVD of the current block include a ¼-Pel precision, the ½-Pel precision, a 1-Pel precision, and a 4-Pel precision. The multiple precisions are coded using a fixed-length coding having a first bin and a second bin, the first bin indicating whether a fractional precision is used.

Aspects of the disclosure provide methods and apparatuses for video encoding/decoding. In some examples, an apparatus for video decoding includes processing circuitry. The processing circuitry can be configured to decode coding information of a current block from a coded video bitstream. The coding information can indicate whether an alternative ¼-Pel interpolation filter (IF) is used for the current block. In response to the coding information indicating that the alternative ¼-Pel IF is used for the current block, the processing circuitry can reconstruct a sample in the current block based on the alternative ¼-Pel IF.

In an example, the coding information includes a flag that indicates whether the alternative ¼-Pel IF is used for the current block.

In an example, the processing circuitry can determine that the alternative ¼-Pel IF is used based on the coding information. A merge candidate in a merge candidate list of a neighboring block of the current block includes a flag and a MV of the current block where the flag indicating that the alternative ¼-Pel IF is used.

In an example, the processing circuitry can prune, for the neighboring block of the current block, the merge candidate list based on motion information and a flag indicating whether the alternative ¼-Pel IF is used for each of at least one merge candidate in the merge candidate list. The at least one merge candidate can include the merge candidate.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 15 is a schematic illustration of a computer system in accordance with an embodiment.

DETAILED DESCRIPTION OF EMBODIMENTS

Figure 1:
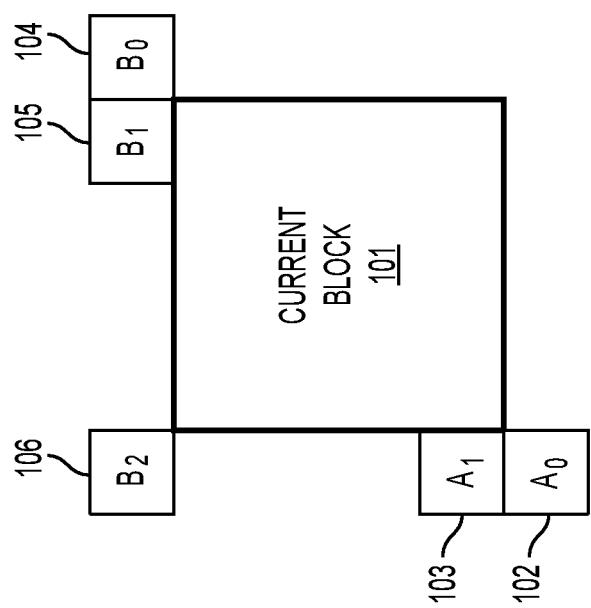
FIG. 1 is a schematic illustration of a current block and its surrounding spatial merge candidates in one example.
Figure 2:
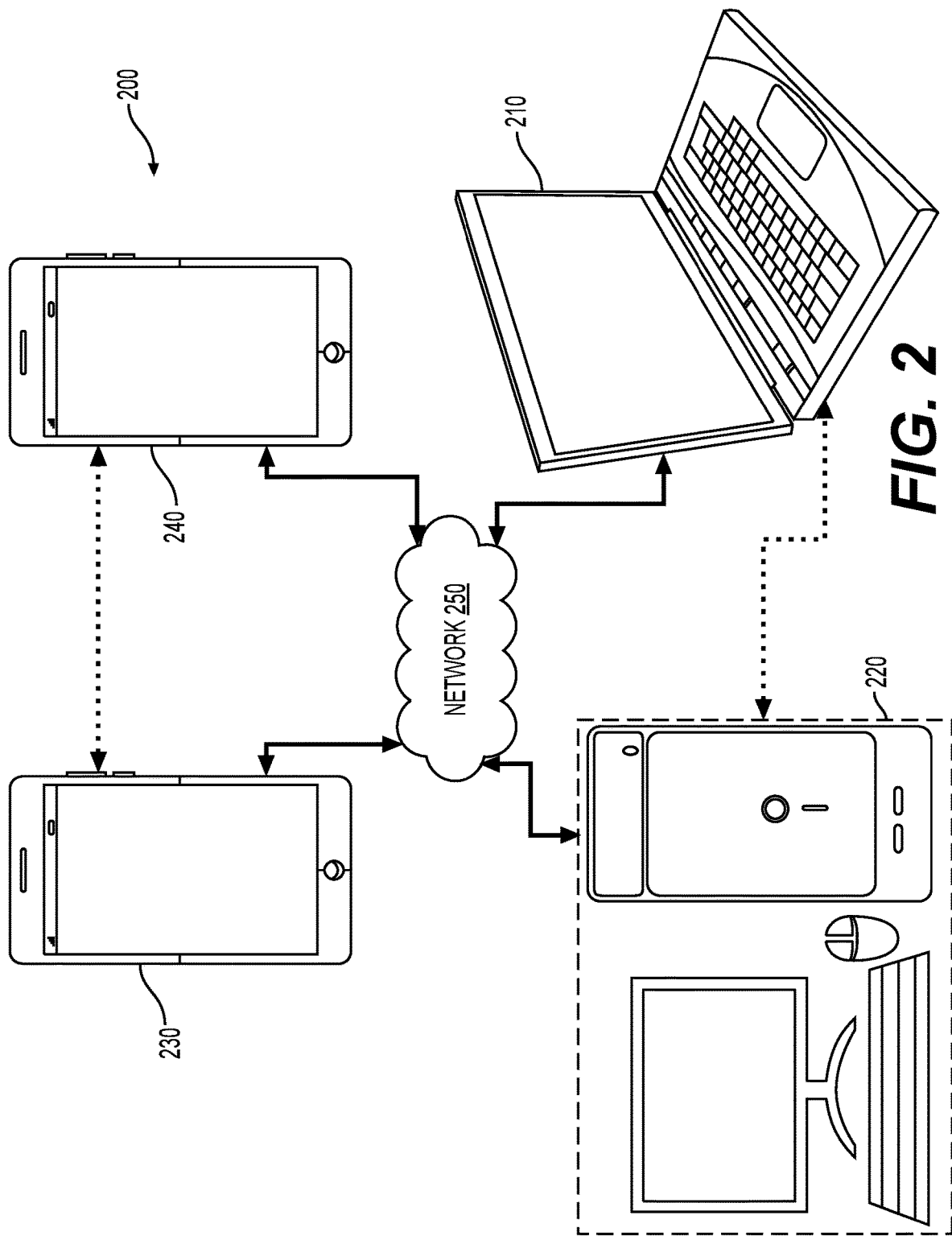
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
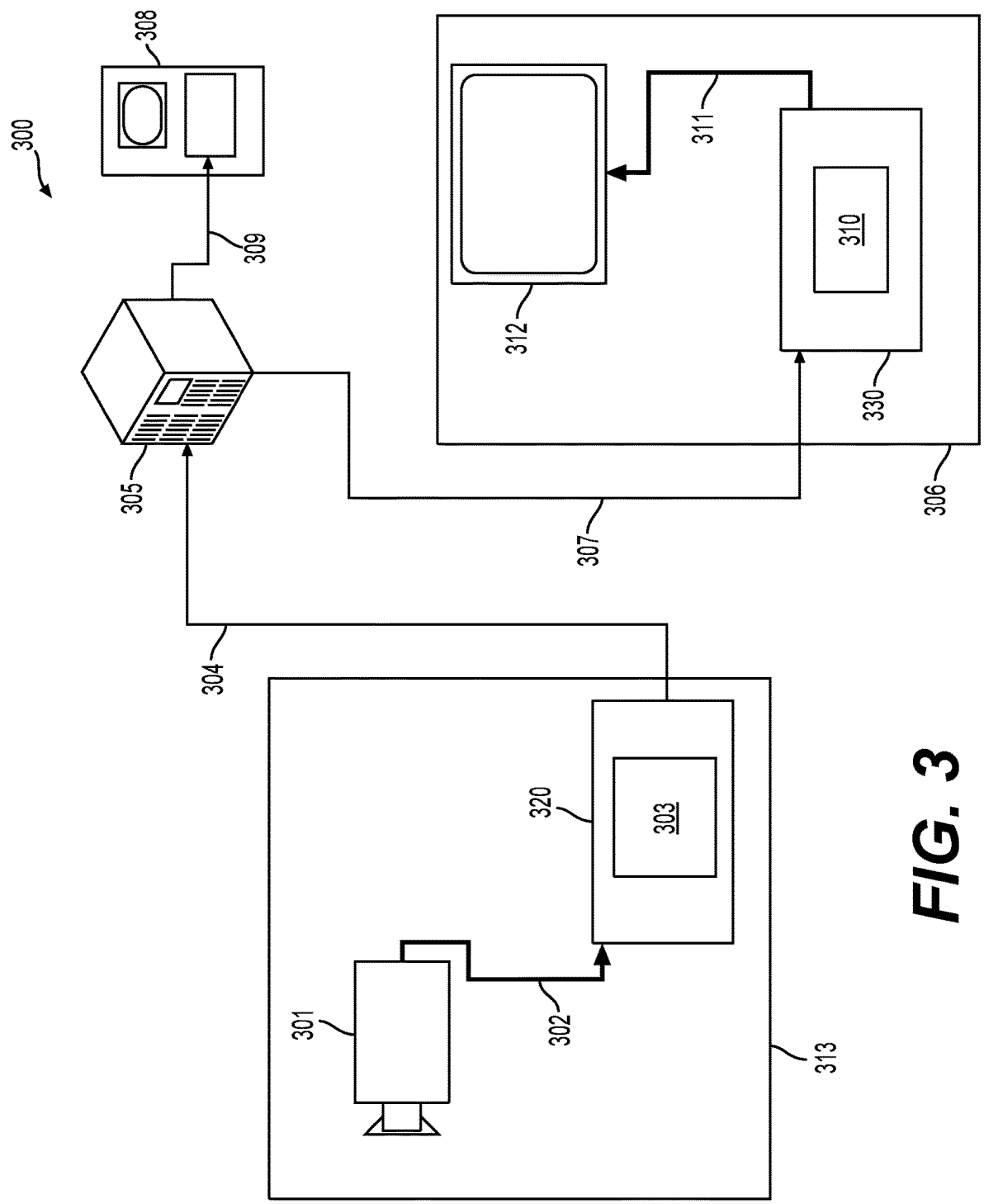
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
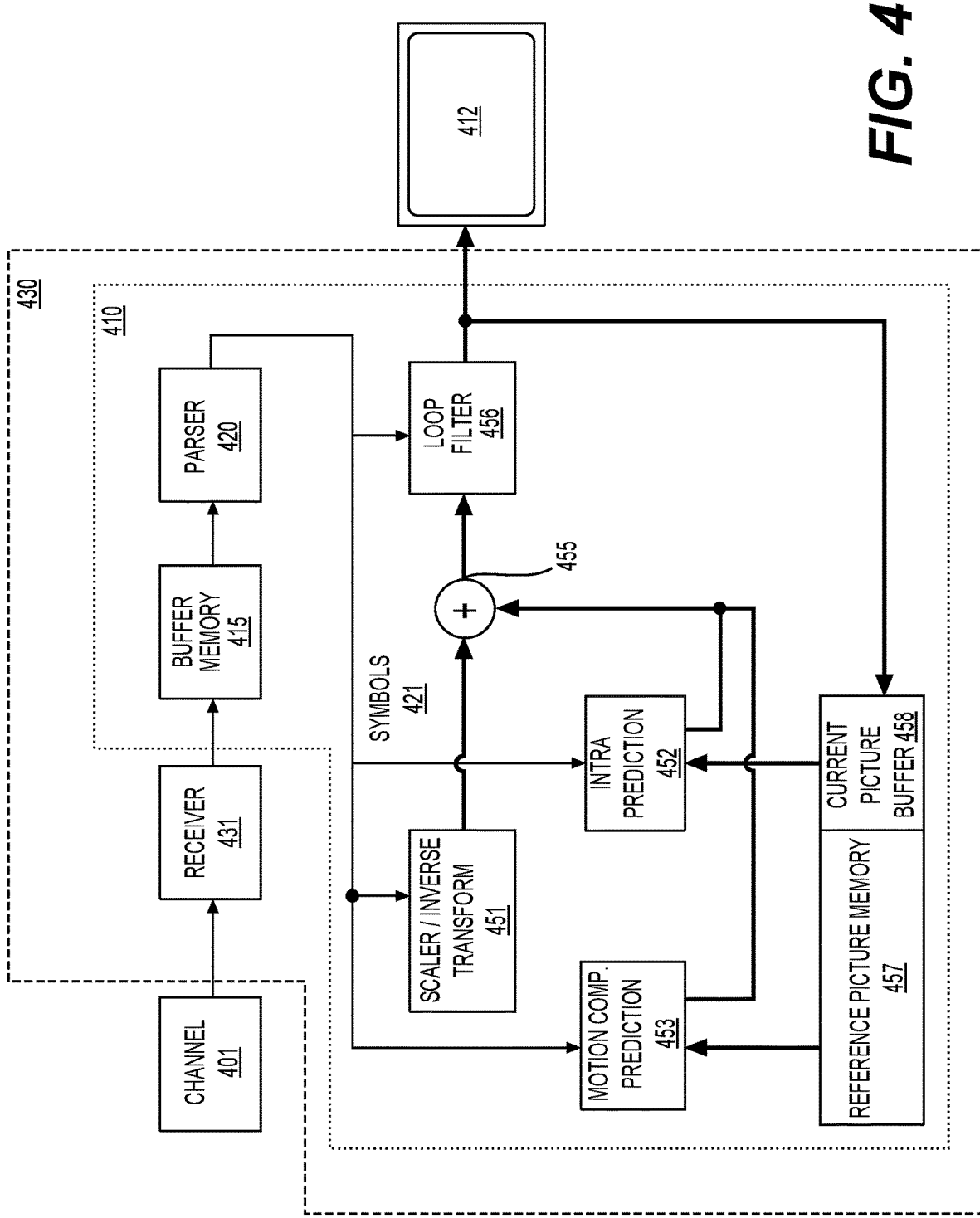
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
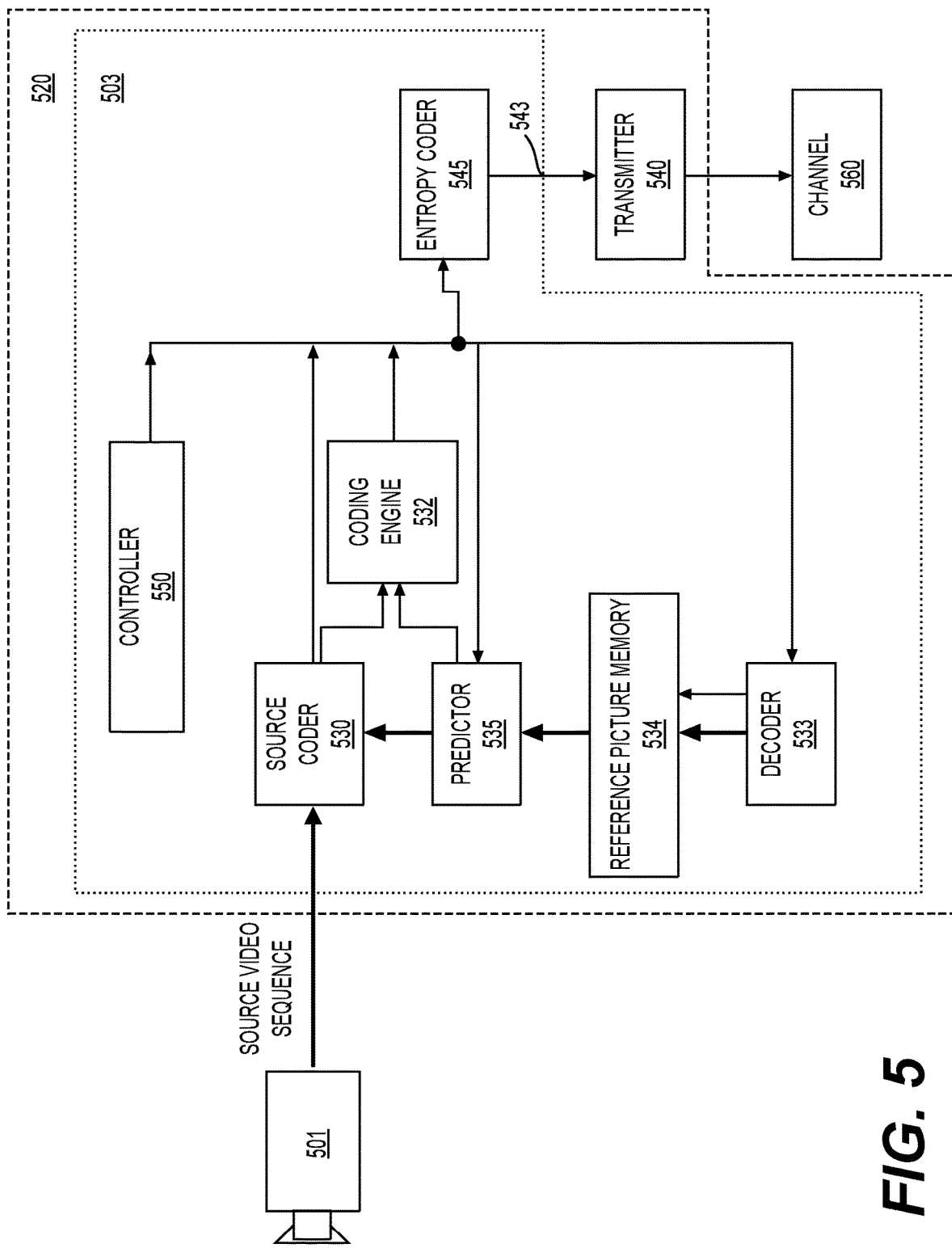
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
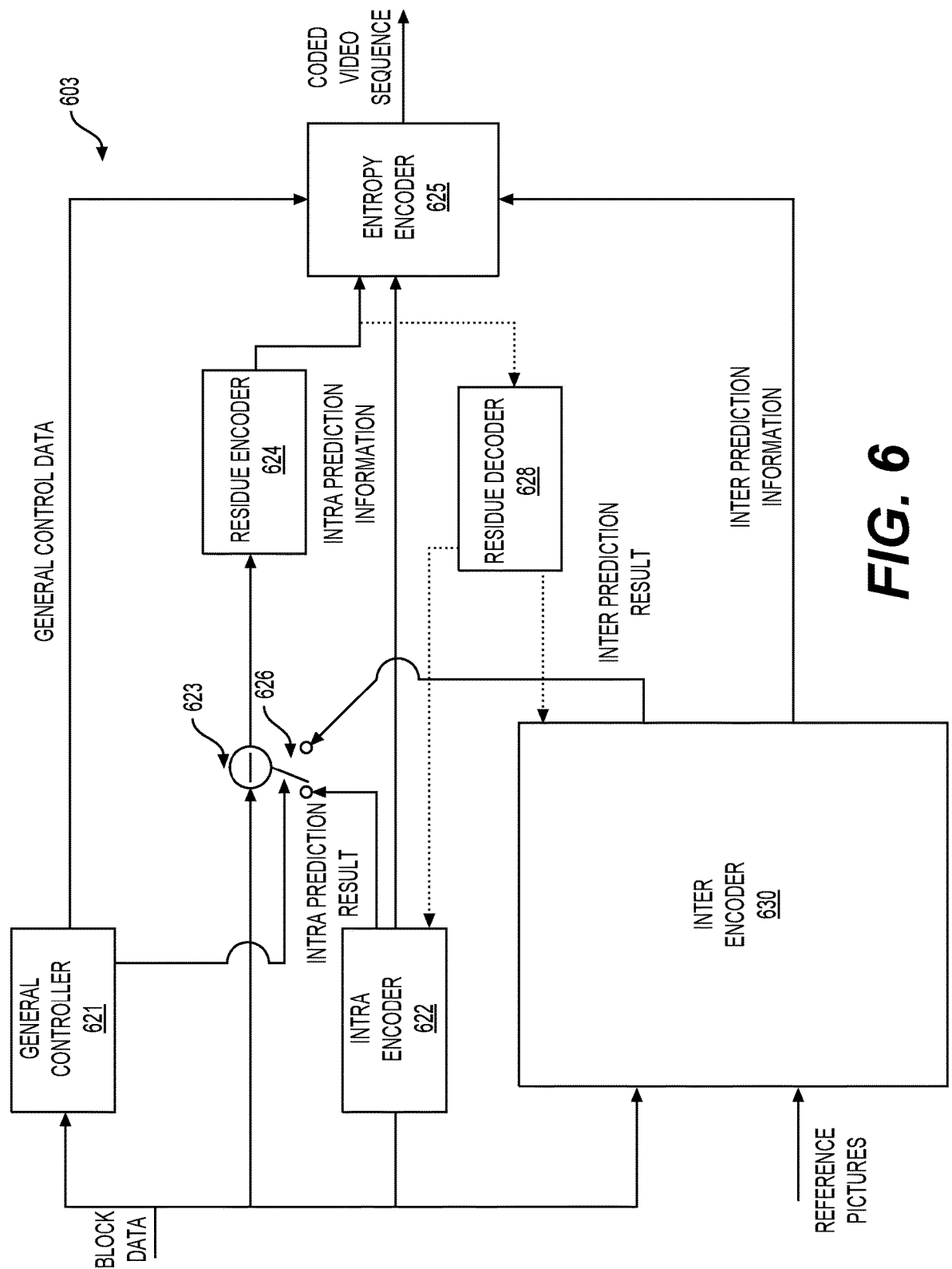
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
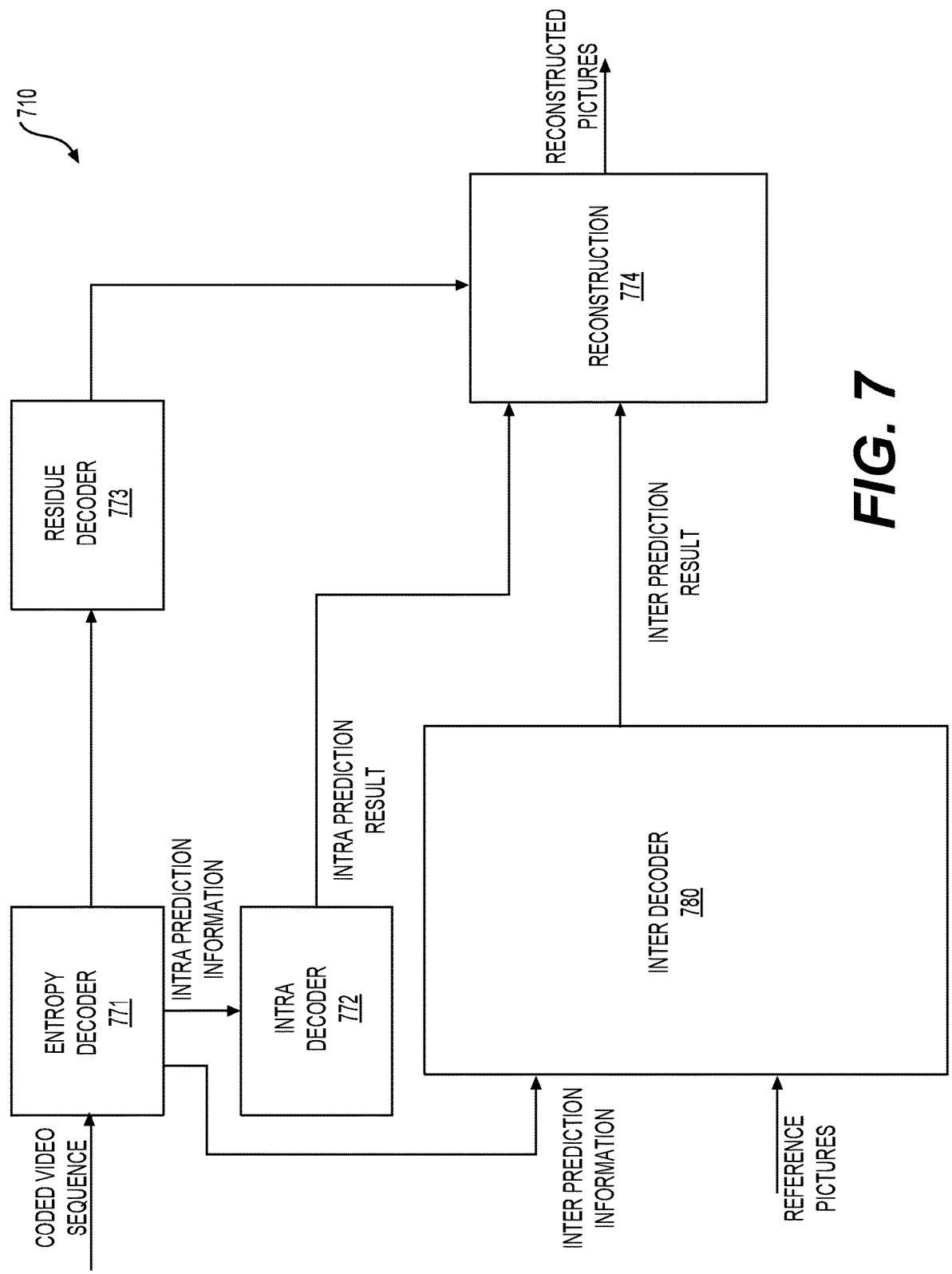
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are related to inter-prediction, such as methods of adaptive motion vector resolution (AMVR) in regular inter motion vector difference (MVD) coding, affine MVD coding, and symmetric MVD (SMVD) coding in advanced video codec.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0), a second reference picture list or a list 1 (L1)) can be used. In bi-prediction, both L0 and L1 can be used. The reference picture list usage index can indicate that the reference picture list(s) include L0, L1, or L0 and L1.

The motion parameters can be signaled in an explicit or implicit manner. When a CU is coded with a skip mode, the CU can be associated with one PU and can have no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) bi-prediction with weighted averaging (BWA), (8) bi-directional optical flow (BDOF), (9) decoder side motion vector refinement (DMVR), (10) triangle partition prediction, and (11) combined inter and intra prediction (CIIP).

In some examples, a translation motion model is applied for motion compensation prediction (MCP). A block-based affine motion compensation (also referred to as affine motion compensated prediction, affine motion compensation method, affine motion prediction, affine motion model, affine transform motion compensation prediction) can be applied, for example, to model various types of motions, such as zoom in/out, rotation, perspective motions, and other irregular motions (e.g., motions that are different from the translation motion).

Figure 8B:
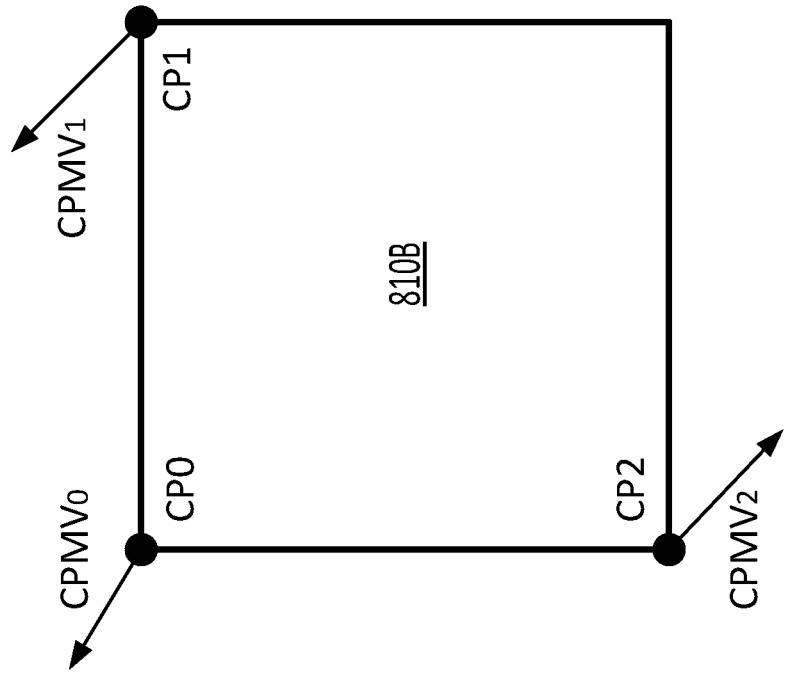
FIG. 8B shows an affine motion model of a block (810B) in accordance with an embodiment of the disclosure.
Figure 8A:
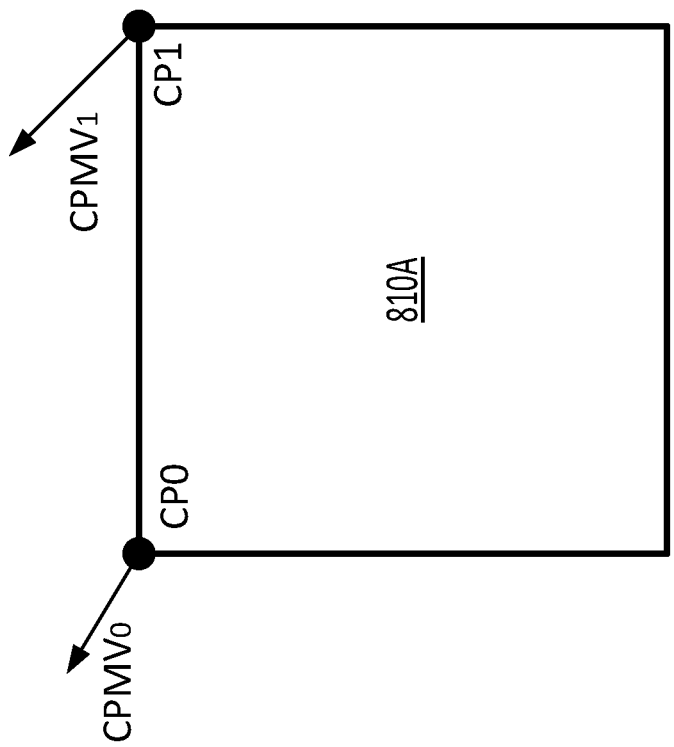
FIG. 8A shows an affine motion model of a block (810A) in accordance with an embodiment of the disclosure.

In FIG. 8A, an affine motion field of a block (810A) is described by motion information of two control points (CPs), CP0 and CP1, when a 4-parameter affine model (or a 4-parameter affine motion model) is used. The motion information can include two MVs or control point MVs (CPMVs), CPMV0 and CPMV1, of CP0 and CP1, respectively. In FIG. 8B, an affine motion field of a block (810B) is described by motion information of three CPs, CP0-CP2, when a 6-parameter affine model (or a 6-parameter affine motion model) is used. The motion information can include three MVs or CPMVs, CPMV0-CPMV2, of CP0-CP2, respectively.

For the 4-parameter affine motion model, a motion vector at a sample location (x, y) in the block (810A) can be derived as:

$$\begin{cases} mv_x = \dfrac{mv_{1x} - mv_{0x}}{W} x - \dfrac{mv_{1y} - mv_{0y}}{W} y + mv_{0x} \\ mv_y = \dfrac{mv_{1y} - mv_{0y}}{W} x + \dfrac{mv_{1x} - mv_{0x}}{W} y + mv_{0y} \end{cases} \quad \text{(Eq. 1)}$$

where $(mv_{0x}, mv_{0y})$ is a MV (CPMV0) of a top-left CP (CP0) and $(mv_{1x}, mv_{1y})$ is a MV (CPMV1) of a top-right CP (CP1). The coordinate (x, y) is with respect to a top-left sample of the block (810A) and W denotes a width of the block (810A).

For the 6-parameter affine motion model, a motion vector at a sample location (x, y) in the block (810B) can be derived as:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad \text{(Eq. 2)}$$

where $(mv_{0x}, mv_{0y})$ is a MV (CPMV0) of a top-left corner CP (CP0), $(mv_{1x}, mv_{1y})$ is a MV (CPMV1) of a top-right corner CP (CP1), and $(mv_{2x}, mv_{2y})$ is a MV (CPMV2) of a bottom-left corner CP (CP2). The coordinate (x, y) is with respect to a top-left sample of the block (810B), W denotes a width of the block (810B), and H denotes a height of the block (810B).

Figure 9:
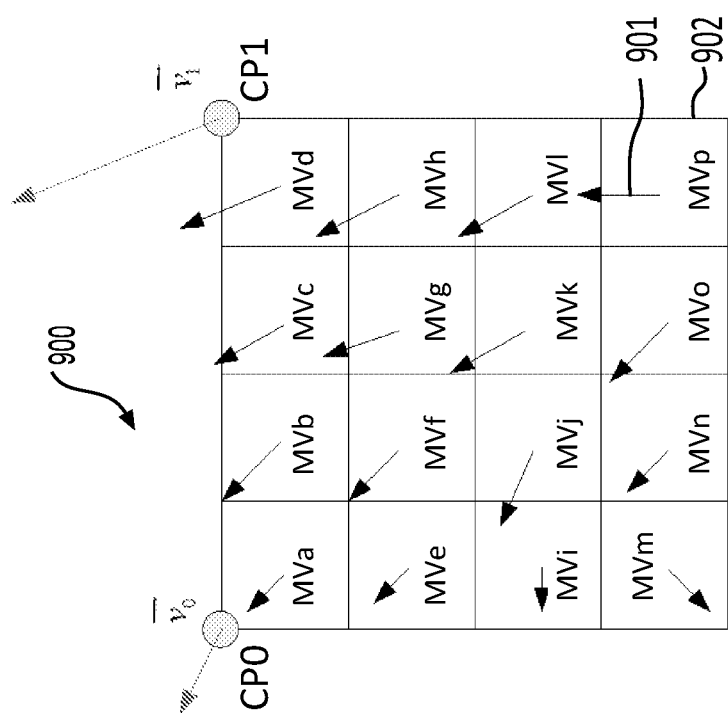
FIG. 9 shows an example of subblock-based affine motion compensation in accordance with an embodiment of the disclosure.

In order to simplify the motion compensation prediction, a subblock-based affine motion compensation (also referred to as a subblock-based affine motion model) is applied in some embodiments, as shown in FIG. 9. In the subblock-based affine motion compensation, a current block (e.g., a luma block) (900) can be partitioned into a plurality of subblocks (also referred to as affine subblocks) (902). MVs of respective samples in each of the plurality of subblocks (902) can be represented using a MV (also referred to as a subblock MV) (901). In an example, a subblock MV (901) of the subblock (902) is a MV of a center sample of the subblock (902). Thus, the subblock MV (901) can be calculated using the 4-parameter affine motion model (e.g., Eq. (1)), the 6-parameter affine motion model (e.g., Eq. (2)), or the like. Referring to FIG. 9, the current block (900) is partitioned to 16 subblocks (902) having 16 subblock MVs (e.g., MVa-MVp) (901).

Referring to FIG. 9, the 4-parameter affine motion model is used as an example. $\vec{v_0}$ and $\vec{v_1}$ are CPMVs for a top-left CP (CP0) and a top-right CP (CP1), respectively. To derive the subblock MV (901) of the subblock (902), the MV of the center sample of the subblock (902) can be calculated according to Eq. (1), and rounded to a 1/16 fraction accuracy (e.g., a precision for the subblock MV is 1/16 of a sample or a pixel). Motion compensation interpolation filters can be applied to generate a prediction of each subblock (902) with the derived MV (901).

A subblock size of chroma-components can be set to be 4×4. A subblock MV of a 4×4 chroma subblock can be calculated as an average of subblock MVs of four corresponding 4×4 luma subblocks.

Similar to translational motion inter prediction, two affine motion inter prediction modes, affine merge mode (or affine merge prediction, an AF_MERGE mode) and affine AMVP mode (or affine AMVP prediction), are employed in some embodiments.

In some embodiments, an affine merge mode (e.g., an AF_MERGE mode) can be applied for CUs with both a width and a height larger than or equal to 8. In the affine merge mode, CPMVs of a current CU can be generated based on motion information of spatial neighboring CUs of the current CU. Up to five CPMV predictor (CPMVP) candidates can be included in a candidate list (e.g., an affine merge candidate list) and an index can be signaled to indicate the candidate to be used for the current CU. The following three types of CPMVP candidates can be used to form an affine merge candidate list: (a) inherited affine merge candidates that are extrapolated from CPMVs of the neighboring CUs (e.g., the spatial neighboring CUs); (b) constructed affine merge candidates that are derived using translational MVs of the neighboring CUs (e.g., the spatial neighboring CUs and/or a temporal neighboring CU); and/or (c) zero MVs.

Figure 10A:
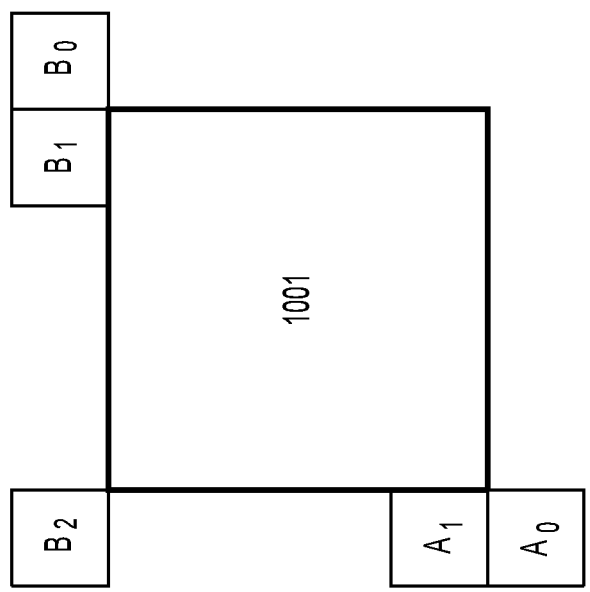
FIG. 10A shows an example of candidate CUs for a CU (1001) in accordance with an embodiment of the disclosure.
Figure 10B:
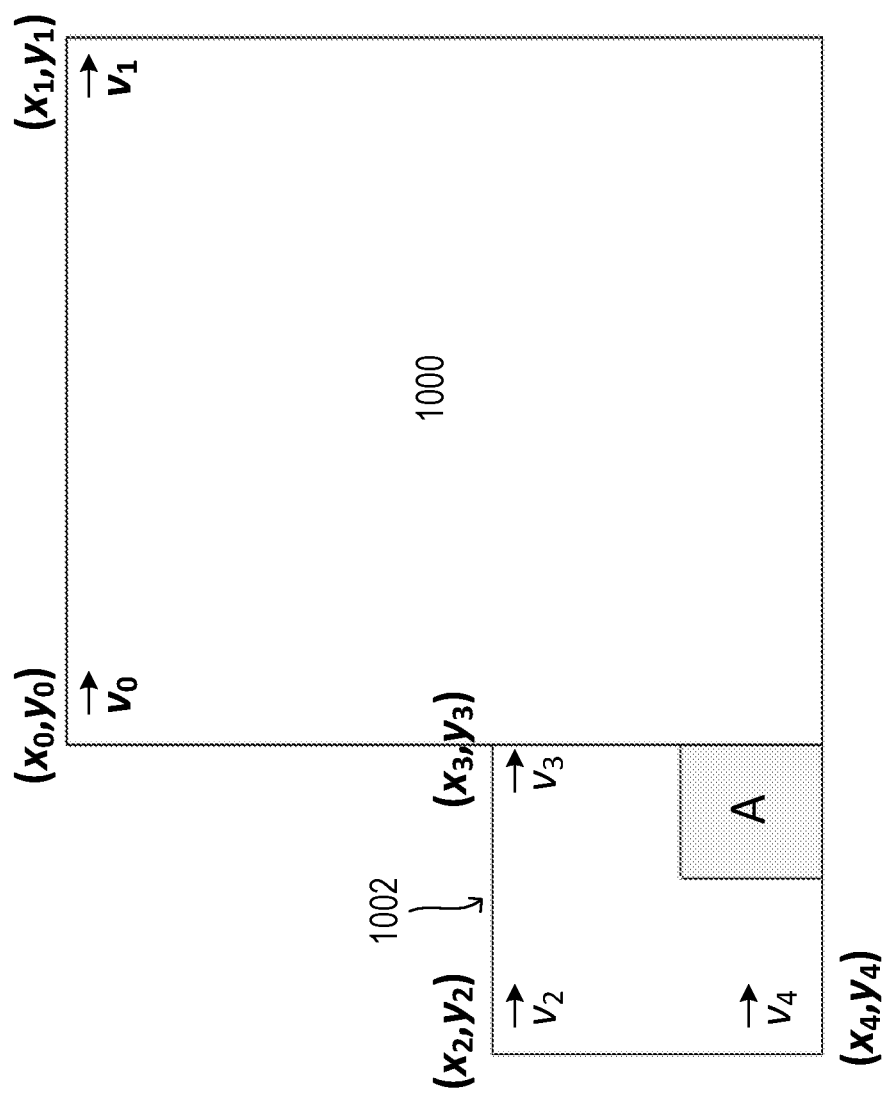
FIG. 10B shows an example of control point motion vector inheritance in accordance with an embodiment of the disclosure.

In an embodiment, such as in VTM3, the candidate list (e.g., the affine merge candidate list) includes up to two inherited affine merge candidates that can be derived from affine motion models of the neighboring CUs (or blocks). For example, a first inherited affine merge candidate can be derived from left neighboring CUs and a second inherited affine merge candidate can be derived from above neighboring CUs. Exemplary candidate CUs (or blocks) for a CU (1001) are shown in FIG. 10A. In order to obtain the first inherited affine merge candidate (or a left predictor), a scan order of A0→A1 can be applied. In order to obtain the second inherited affine merge candidate (or an above predictor), a scan order can be B0→B1→B2. In an example, only a first inherited candidate from each side (e.g., left side and/or above side) is selected. In addition, no pruning check is performed between two inherited candidates. When a neighboring affine CU is identified, CPMVs of the neighboring affine CU can be used to derive a CPMVP candidate in the affine merge candidate list of the current CU. As shown in FIG. 10B, if a neighboring left bottom block A is coded in an affine motion mode, MVs v2, v3, and v4 of a top left corner, a top right corner, and a left bottom corner of a CU (1002) that includes the block A can be obtained. When the block A is coded with the 4-parameter affine motion model, two CPMVs of the current CU (1000) can be calculated according to v2 and v3. When the block A is coded with the 6-parameter affine motion model, three CPMVs of the current CU (1000) can be calculated according to v2, v3, and v4.

A constructed affine merge candidate for a CU can refer to a candidate that is constructed by combining neighboring translational motion information of each CP of the CU. The motion information for the CPs can be derived from spatial neighbors and a temporal neighbor of a current block (1100) shown in FIG. 11. $CPMV_k$ (k=1, 2, 3, 4) can represent a k-th CP of the current block (1100). For the $CPMV_1$, blocks B2, B3, and A2 can be checked. For example, a scan order is B2→B3→A2 and a MV of the first available block can be used as the $CPMV_1$. For the $CPMV_2$, blocks B1 and B0 can be checked, for example using a scan order of B1→B0. For the $CPMV_3$, blocks A1 and A0 can be checked, for example using a scan order of A1→A0. When a temporal motion vector predictor (TMVP) (indicated by T in FIG. 11) is available, the TMVP can be applied as the $CPMV_4$.

After MVs of four CPs are obtained, affine merge candidates can be constructed based on the motion information of the four control points. The following combinations of CPMVs can be used to construct the affine merge candidates sequentially:
$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$.

A combination of 3 CPMVs can construct a 6-parameter affine merge candidate and a combination of 2 CPMVs can construct a 4-parameter affine merge candidate. To avoid a motion scaling process, if reference indices of control points are different, the corresponding combination of CPMVs can be discarded.

After inherited affine merge candidates and constructed affine merge candidates are checked, if the affine merge candidate list is not full, zero MVs can be inserted to the end of the affine merge candidate list.

In some embodiments, an affine AMVP mode can be applied for CUs with both a width and a height larger than or equal to 16. An affine flag in a CU level can be signaled in a bitstream to indicate whether the affine AMVP mode is used and then another flag can be signaled to indicate whether a 4-parameter affine motion model or a 6-parameter affine motion model is used. In the affine AMVP mode, a difference of CPMVs of a current CU and corresponding CPMV predictors (CPMVP) can be signaled in the bitstream. An affine AMVP candidate list size can be 2, and can be generated by using the following four types of CPMV candidates, for example, in an order of (a)→(b)→(c)→(d): (a) Inherited affine AMVP candidates that are extrapolated from the CPMVs of the neighbor CUs; (b) Constructed affine AMVP candidates that are derived using the translational MVs of the neighbor CUs; (c) Translational MVs from neighboring CUs; and (d) Zero MVs.

The checking order (or scan order) of the inherited affine AMVP candidates is similar or identical to the checking order of the inherited affine merge candidates in an example. In an example, a difference between the inherited affine AMVP candidates and the inherited affine merge candidates is that, for the inherited affine AMVP candidates, only the affine CU that has the same reference picture as in the current block is considered. No pruning process is applied when inserting an inherited affine MV predictor (or inherited affine AMVP candidate) into the affine AMVP candidate list.

Figure 11:
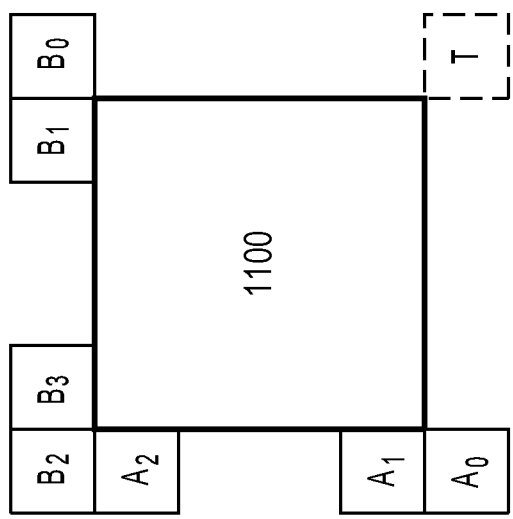
FIG. 11 shows an example of candidate positions for constructing an affine merge candidate in accordance with an embodiment of the disclosure.

A constructed AMVP candidate can be derived from specified spatial neighbors shown in FIG. 11. A same checking order as used in constructing affine merge candidate(s) can be used. In addition, a reference picture index of a neighboring block can also be checked. The first block in the checking order that is inter coded and has the same reference picture as in the current CU can be used. When the current CU is coded with a 4-parameter affine motion model, and CPMV1 and CPMV2 are both available, the available CPMVs (e.g., CPMV1 and CPMV2) can be added as one candidate in the affine AMVP candidate list. When the current CU is coded with a 6-parameter affine motion mode, and all three CPMVs (e.g., CPMV1, CPMV2, and CPMV3) are available, the available CPMVs can be added as one candidate in the affine AMVP candidate list. Otherwise, a constructed AMVP candidate can be set as unavailable.

If the affine AMVP candidate list size is less than 2 after inherited affine AMVP candidate(s) and constructed AMVP candidate(s) are checked, translational MVs from neighboring CU(s) of the current block (1100) can be added to predict all control point MVs of the current block (1100), when available. Finally, zero MVs can be used to fill the affine AMVP candidate list if the affine AMVP candidate list is still not full.

Aspects of the disclosure are related to AMVR methods or schemes. In some examples (e.g., in HEVC), a MVD between a MV and a predicted MV (also referred to as a MV predictor) of a block (e.g., a CU, a coding block) can be signaled in units of quarter-luma-sample (or quarter-pixel precision or ¼-Pel precision) when a flag (e.g., a use_integer_mv_flag) is equal to 0, for example, in a slice header. In some examples (e.g., in VVC), a CU-level AMVR scheme can be used where a MVD of a CU can be coded in different precisions, also referred to as MVD precisions or MVD resolutions. Dependent on a mode (e.g., a normal AMVP mode, an affine AVMP mode) for the CU, the MVD resolution (or the MVD precision) of the CU can be adaptively selected, such as shown in Table 1.

The normal AMVP mode can refer to regular inter prediction with an AMVP mode that is signaled for the block (e.g., a coding block). In an example, an AMVR flag is signaled when the AMVP mode is used.

For the normal AMVP mode, the MVD resolution can specify a resolution of one or more MVDs for the block. For the affine AMVP mode, the MVD resolution can specify a resolution of one or more MVDs for CPs of the block.

Table 1 shows some exemplary MVD resolutions of the CU, such as precisions available to be used for a component of the MVD of the CU. The precisions available to be used by the CU can include a combination of any suitable precisions. The precisions available to be used by the CU can depend on a prediction mode (e.g., a normal AMVP mode, an affine AMVP mode, an IBC mode) for the CU. In an example, the precisions or MVD resolutions include the ¼-Pel (or ¼-pel) precision, a half-pixel (½-Pel or ½-pel)

precision, a one-pixel (1-Pel or 1-pel) precision, and a four-pixel (4-Pel or 4-pel) precision for the normal AMVP mode. In the normal AMVP mode, samples in the CU can share the same motion information. In an example, the precisions or MVD resolutions include the ¼-Pel precision, a ¹⁄₁₆-Pel (or ¹⁄₁₆-pel) precision, and the 1-Pel precision for the affine AMVP mode. In the affine AMVP mode, samples in the CU can have different motion information. In an example, the precisions or MVD resolutions include the 1-Pel precision and a 4-Pel precision for the IBC AMVP mode. In an example, in the IBC AMVP mode, the CU in a current picture can be predicted from a block in the current picture.

(e.g., a negative MV predictor is rounded toward positive infinity and a positive MV predictor is rounded toward negative infinity).

In some examples, a MVD precision of a coding block, such as an AMVR type, can be signaled as described below.

A flag (or an AMVR flag, e.g., amvr_flag[x0][y0]) can specify a resolution of a MVD (or a MVD resolution or MVD precision) of the coding block. Array indices x0, y0 can specify a location (x0, y0) of a top-left luma sample of the coding block relative to a top-left luma sample of a picture including the coding block. The AMVR flag (e.g., amvr_flag[x0][y0]) being equal to 0 can specify that the resolution of the MVD is ¼ of a luma sample (or ¼-Pel), as

TABLE 1

Exemplary MVD resolutions of a CU

|  | AMVR type = 0 | AMVR type = 1 | AMVR type = 2 | AMVR type = 3 |
|---|---|---|---|---|
| Normal AMVP mode | ¼ pel | 1 pel | 4 pel | ½ pel |
| Affine AMVP mode | ¼ pel | ¹⁄₁₆ pel | 1 pel | — |
| IBC AMVP mode | — | 1 pel | 4 pel | — |

The CU-level MVD resolution indication can be conditionally signaled if the CU has at least one non-zero MVD component. In an example, if all MVD components (e.g., both horizontal and vertical MVDs for a reference list L0 and a reference list L1) are zero, the quarter-luma-sample MVD resolution is inferred.

For a current CU that has at least one non-zero MVD component, a first flag can be signaled to indicate whether the quarter-luma-sample MVD precision is used for the current CU. If the first flag is 0 (e.g., corresponding to AMVR type=0 in Table 1), no further signaling is needed and the quarter-luma-sample MVD precision is used for the current CU. In an example, the current CU is coded using the normal AMVP mode or the affine AMVP mode. Otherwise, the first flag is not 0, and a second flag can be signaled to indicate whether a half-luma-sample MVD precision is used for the current CU coded, for example, with the normal AMVP mode.

If the second flag is 0 (e.g., corresponding to AMVR type=3 in Table 1), no further signaling is needed and the half-luma-sample MVD precision is used for the current CU, for example, coded with the normal AMVP mode. In some examples, an alternative half-Pel interpolation filter (IF) is be used in the motion compensation. Otherwise, the second flag is not 0, a third flag can be signaled to indicate whether the 1-Pel (or integer-luma-sample) (e.g., corresponding to AMVR type=1 in Table 1) or the 4-Pel (or four-luma-sample) MVD precision (e.g., corresponding to AMVR type=2 in Table 1) is used for the current CU that is coded using the normal AMVP mode.

The same second flag can be used to indicate whether the integer-luma-sample or a ¹⁄₁₆-Pel (or ¹⁄₁₆-luma-sample) MVD precision (e.g., corresponding to AMVR type=1 in Table 1) is used for the current CU that is coded using the affine AMVP mode.

In order to ensure that a reconstructed MV can have an intended precision (e.g., the quarter-luma-sample (or ¼-Pel), the integer-luma-sample (or 1-Pel), or the four-luma-sample (or 4-Pel)), MV predictor(s) or MVP(s) for a CU can be rounded to a same precision as that of corresponding MVD(s) before being added together with the corresponding MVD(s). The MV predictor(s) can be rounded toward zero shown in Table 2. The AMVR flag (e.g., amvr_flag[x0][y0]) being equal to 1 can specify that the resolution of the MVDe can be further specified by a flag (or an AMVR precision index, e.g., amvr_precision_idx[x0][y0]).

When the AMVR flag (e.g., amvr_flag[x0][y0]) is not present, the AMVR flag can be inferred as follows: (i) If CuPredMode[chType][x0][y0] is equal to MODE_IBC indicating that a prediction mode (e.g., CuPredMode[chType][x0][y0]) for the coding block is an IBC mode (e.g., MODE_IBC), the AMVR flag (e.g., amvr_flag[x0][y0]) can be inferred to be equal to 1. (ii) Otherwise, CuPredMode[chType][x0][y0] is not equal to MODE_IBC indicating that the prediction mode for the coding block is not the IBC mdoe, the AMVR flag (e.g., amvr_flag[x0][y0]) can be inferred to be equal to 0.

Referring to Table 2, the AMVR precision index (e.g., amvr_precision_idx[x0][y0]) (e.g., being equal to 0, 1, or 2) can specify the resolution of the MVD and/or a shift (e.g., AmvrShift) corresponding to the resolution of the MVD for the coding block coded with the prediction mode (e.g., the IBC mode or the IBC AMVP mode, the affine AMVP mode, the normal AMVP mode). As described above, the array indices x0, y0 can specify the location (x0, y0) of the top-left luma sample of the coding block relative to the top-left luma sample of the picture.

When the AMVR precision index (e.g., amvr_precision_idx[x0][y0]) is not present, the AMVR precision index can be inferred to be equal to 0.

The MVDs can be modified based on the resolution of the MVD (e.g., AmvrShift) for the coding block as follows. If inter_affine_flag[x0][y0] is equal to 0, for example, indicating that the prediction mode is not the affine AMVP mode, then variables MvdL0[x0] [y0] [0], MvdL0[x0][y0][1], MvdL1[x0] [y0] [0], MvdL1[x0][y0][1] are modified as follows:

$$MvdL0[x0][y0][0]=MvdL0[x0][y0][0]<<AmvrShift \qquad (Eq.\ 3)$$

$$MvdL0[x0][y0][1]=MvdL0[x0][y0][1]<<AmvrShift \qquad (Eq.\ 4)$$

$$MvdL1[x0][y0][0]=MvdL1[x0][y0][0]<<AmvrShift \qquad (Eq.\ 5)$$

$$MvdL1[x0][y0][1]=MvdL1[x0][y0][1]<<AmvrShift \qquad (Eq.\ 6)$$

where the variables MvdL0[x0][y0][0], MvdL0[x0][y0][1], MvdL1[x0][y0][0], MvdL1[x0][y0][1] can represent a horizontal component of a first MVD for the reference picture L0, a vertical component of the first MVD for the reference picture L0, a horizontal component of a second MVD for the reference picture L1, and a vertical component of the second MVD for the reference picture L1.

Otherwise, inter_affine_flag[x0][y0] is equal to 1, for example, indicating that the prediction mode is the affine AMVP mode, and variables MvdCpL0[x0][y0][0][0], MvdCpL0[x0][y0][0][1], MvdCpL0[x0][y0][1][0], MvdCpL0[x0][y0][1][1], MvdCpL0[x0][y0][2][0] and MvdCpL0[x0][y0][2][1] can be modified as follows:

$$MvdCpL0[x0][y0][0][0]=MvdCpL0[x0][y0][0][0]<<AmvrShift \quad \text{(Eq. 7)}$$

$$MvdCpL1[x0][y0][0][1]=MvdCpL1[x0][y0][0][1]<<AmvrShift \quad \text{(Eq. 8)}$$

$$MvdCpL0[x0][y0][1][0]=MvdCpL0[x0][y0][1][0]<<AmvrShift \quad \text{(Eq. 9)}$$

$$MvdCpL1[x0][y0][1][1]=MvdCpL1[x0][y0][1][1]<<AmvrShift \quad \text{(Eq. 10)}$$

$$MvdCpL0[x0][y0][2][0]=MvdCpL0[x0][y0][2][0]<<AmvrShift \quad \text{(Eq. 11)}$$

$$MvdCpL1[x0][y0][2][1]=MvdCpL1[x0][y0][2][1]<<AmvrShift \quad \text{(Eq. 12)}$$

where the variables MvdCpL0[x0][y0][0][0], MvdCpL0[x0][y0][0][1], MvdCpL0[x0][y0][1][0], MvdCpL0[x0][y0][1][1], MvdCpL0[x0][y0][2][0] and MvdCpL0[x0][y0][2][1] can represent a horizontal component of a first CP MVD, a vertical component of the first CP MVD, a horizontal component of a second CP MVD, a vertical component of the second CP MVD, and a horizontal component of a third CP MVD, a vertical component of the third CP MVD.

half-pel IF index (e.g., hpelIfIdx) is 1. Otherwise, when the shift (e.g., AmvrShift) is not 3 indicating that the MVD precision is not ½-Pel, the value of the half-pel IF index (e.g., hpelIfIdx) is 0. The half-pel IF index (e.g., hpelIfIdx) can be inherited during an inter merge process. The spatial inter merge candidates (also referred to as spatial merge candidates) can include the half-pel IF index or flag (e.g., hpelIfIdx) along with other motion information (e.g., MV(s), reference picture L0 and/or L1.

In an example, the inter merge process includes a regular merge mode, and other merge modes that use regular merge candidate as bases. In an example, the inter merge process refers to an inter merge mode. The inter merge process can include tools, such as spatial merge, temporal merge, and/or pair-wise average where two uni-direction MV candidates are combined together, history-based MVP (HMVP), MMVD, or the like. In an example, a merge flag is true (e.g., a value of 1) in the inter merge process.

In an example, at a decoder size, when the MVD precision is the ½-pel precision, the decoder can set up an internal flag (e.g., not signaled) to indicate the usage of the alternative half-pel IF. In an example, the internal flag is not signaled in syntax. The internal flag can be stored for the block. Thus, the internal flag can propagate. When merged (e.g., without signaling of a MVD) with a spatial neighboring block, the internal flag can be inherited from the spatial neighboring block.

In some examples, the MVD precision or the AMVR for the normal inter AMVP mode includes the half-pel precision (½-Pel), and the alternative half-pel IF is used when the half-pel precision (also referred to as the AMVR half-pel precision) is used. The usage of the alternative half-pel IF

TABLE 2

Examples of AmvrShift

| | | AmvrShift | | |
|---|---|---|---|---|
| amvr_flag | amvr_precision_idx | inter_affine_flag == 1 | CuPredMode [chType][x0][y0] == MODE_IBC) | inter_affine_flag == 0 && CuPredMode [chType][x0][y0] != MODE_IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) |

Referring to Table 2, the shifts (e.g., AmvrShift) 0 (no shift), 2 (e.g., shifting 2 bits), 3 (e.g., shifting 3 bits), 4 (e.g., shifting 4 bits), and 6 (e.g., shifting 6 bits) can correspond to the MVD precisions of 1/16-Pel (e.g., 1/16 luma sample), ¼-Pel (e.g., ¼ luma sample), ½-Pel (e.g., ½ luma sample), 1-Pel (e.g., 1 luma sample), and 4-Pel (e.g., 4 luma sample), respectively.

An alternative half-pel interpolation filter (IF) can be used according to aspects of the disclosure. In the normal AMVP mode, when the MVD precision (also referred to as AMVR precision) is signaled to be ½-Pel or ½ luma sample for a block, the alternative half-pel IF can be used in motion compensation for the block. A half-pel IF index or flag (e.g., hpelIfIdx) can be used to indicate whether the alternative half-pel IF is used. A value of the half-pel IF index (e.g., hpelIfIdx) can be derived as follows:

$$hpelIfIdx = AmvrShift == 3?1:0 \quad \text{(Eq. 13)}$$

Referring to Table 2, when the shift (e.g., AmvrShift) is 3 indicating that the MVD precision is ½-Pel, the value of the can be indicated by a flag (also referred to as a half-pel IF flag, e.g., hpelIfIdx). In some examples, such as in the inter merge mode (or the inter merge process), the half-pel IF flag is inherited from spatial neighbor(s). However, the half-pel IF flag is not considered during a pruning process.

In some examples, the half-pel IF flag is considered in a pruning process, such as a merge candidate pruning process. Accordingly, merge candidates can be pruned by considering the half-pel IF flag. In the merge candidate pruning process, a usage of the alternative half-pel IF can be considered.

The half-pel IF flag (e.g., denoted as hpelIfIdx) for the alternative half-pel IF can be used along with motion information in a pruning process (e.g., a merge candidate pruning process).

In an embodiment, the half-pel IF flag (e.g., denoted as hpelIfIdx) for the alternative half-pel IF is used along with motion information (e.g., including reference picture used, MV(s), such as value(s) of the MV(s), or the like) to compare merge candidates (e.g., two merge candidates) for a pruning purposes. In an example, only when both the motion information and a value of the half-pel IF flag (e.g., hpelIfIdx) are identical between the two merge candidates, the two merge candidates are considered to be identical, and thus one of the two merge candidates may be pruned (e.g., removed from the merge candidate list).

In an example, a merge candidate list includes a first merge candidate that includes first motion information and a first flag for a first neighboring block. The first flag can indicate whether the alternative half-Pel IF is used for the first neighboring block. A second merge candidate includes second motion information and a second flag for a second neighboring block. The second flag can indicate whether the alternative half-Pel IF is used for the second neighboring block. The first merge candidate and the second merge candidate can be compared. In an example, when the first motion information and the second motion information are identical and the first flag is identical to the second flag, the first merge candidate and the second merge candidate are considered to be identical, and thus the second merge candidate may not be added to the merge candidate list.

In some examples, coding information of a current block can be decoded from a coded video bitstream. The coding information can indicate the inter merge mode (e.g., the normal AMVP mode) for the current block. A merge candidate list for the current block can include at least one merge candidate. Each of the at least one merge candidate can include motion information and a flag indicating whether the alternative half-Pel IF is used for a respective neighboring block of the current block. Each of the at least one merge candidate can be of the respective neighboring block of the current block. According to aspects of the disclosure, the merge candidate list can be pruned based on the motion information and the flag associated with the respective merge candidate. In some examples, the merge candidate includes the motion information and the flag. A sample in the current block can be reconstructed based on one of the at least one merge candidate. The motion information can include a motion vector and a corresponding reference picture for the neighboring block of the current block.

In an example, the at least one merge candidate includes a first candidate and a second candidate. The first candidate includes first motion information (e.g., a first MV and a first reference picture being L0) and a first flag of a first neighboring block. The first flag can indicate whether the alternative half-Pel IF is used for the first neighboring block. The second candidate includes second motion information (e.g., a second MV and a second reference picture being L0) and a second flag of a second neighboring block. The second flag can indicate whether the alternative half-Pel IF is used for the second neighboring block. The first neighboring block and the second neighboring block can be neighboring blocks of the current block.

One of the first candidate and the second candidate can be pruned based on the first motion information, the second motion information, the first flag, and the second flag.

The merge candidate list can be pruned based on the first motion information, the second motion information, the first flag, and the second flag.

In an example, whether the first candidate is identical to the second candidate can be determined based on the first motion information, the second motion information, the first flag, and the second flag. For example, when the first motion information is identical to the second motion information and the first flag is identical to the second flag, the first candidate is determined to be identical to the second candidate, and thus one of the first candidate and the second candidate can be pruned (e.g., removed from the merge candidate list).

In an example, the first motion information includes a first MV and a first reference picture (e.g., L0), and the second motion information includes a second MV and a second reference picture (e.g., L0). In an example, the first motion information includes first MVs (e.g., MV1 and MV2) and corresponding first reference pictures (e.g., L0 for MV1 and L1 for MV2), and the second motion information includes second MVs (e.g., MV3 and MV4) and corresponding second reference pictures (e.g., L0 for MV3 and L0 for MV4).

Any suitable signaling can be applied for AMVR coding. In an example, coding information of a block in a current picture can be decoded from a coded video bitstream. The coding information can include a flag or a bin (also referred to as a half-Pel flag or a half-Pel bin) indicating whether the half-Pel precision is used for a component of a MVD of the block.

In some examples, variable-length coding can be used, as described above in Tables 3-6. In an example, a signaling order (or binarization) of AMVR (also referred to as AMVR precision or MVD precision) for the normal AMVP mode is shown in Table 3 as below.

TABLE 3

| Binarization | AMVR Precision |
| --- | --- |
| 0 | ¼-Pel |
| 10 | ½-Pel (with the alternative half-pel IF) |
| 110 | 1-Pel |
| 111 | 4-Pel |

As shown in Table 3, a first bin or a first flag can be used to code whether the ¼-Pel precision is used for a block (e.g., for a component of a MVD for the block), a second bin or a second flag can be used to code whether the ½-Pel precision is used for the block. In an example, when the ½-Pel precision is used, the alternative half-pel IF is used for motion compensation for the block. A third bin or a third flag can be used to code whether the 1-Pel or the 4-Pel precision is used for the block.

The above signaling order or the binarization of the MVD precision can be suitably adapted. In general, any suitable signaling order can be used for the MVD precision to optimize for coding efficiency and improve coding performance.

In some examples, multiple AMVR precisions available to be used for the component of the MVD of the block include the ¼-Pel precision, the ½-Pel precision, the 1-Pel precision, and the 4-Pel precision.

The half-Pel flag or the half-Pel bin indicating whether the ½-Pel precision is used for the block may be signaled after one or more flags that indicate usages of one or more MVD precisions. In an example, the half-Pel flag is signaled after a flag for the ¼-Pel precision that indicates whether the ¼-Pel precision is used and signaled after a flag for the 1-Pel precision that indicates whether the 1-Pel precision is used, as shown in Tables 4-5. Table 4 shows an example of the binarization of AMVR for the normal AMVP mode.

Table 4 shows an example of the binarization of the MVD precision for the normal AMVP mode

| Binarization | AMVR Precision |
|---|---|
| 0 | ¼-Pel |
| 10 | 1-Pel |
| 110 | 4-Pel |
| 111 | ½-Pel (with the alternative half-pel IF) |

As shown in Table 4, a first flag can be used to code whether the ¼-Pel precision is used for a block (e.g., for a component of a MVD for the block), a second flag can be used to code whether the 1-Pel precision is used for the block. A third flag can be used to code whether the ½-Pel or the 4-Pel precision is used for the block and thus can be referred to as the half-Pel flag. In an example, when the ½-Pel precision is used, the alternative half-pel IF is used for motion compensation for the block.

Table 5 shows an example of the binarization of AMVR for the normal AMVP mode.
Table 5 shows an example of the binarization of the MVD precision for the normal AMVP mode

| Binarization | AMVR Precision |
|---|---|
| 0 | ¼-Pel |
| 10 | 1-Pel |
| 110 | ½-Pel (with the alternative half-pel IF) |
| 111 | 4-Pel |

As shown in Table 5, a first flag can be used to code whether the ¼-Pel precision is used for a block (e.g., for a component of a MVD for the block), a second flag can be used to code whether the 1-Pel precision is used for the block. A third flag can be used to code whether the ½-Pel or the 4-Pel precision is used for the block and thus can be referred to as the half-Pel flag. In an example, when the ½-Pel precision is used, the alternative half-pel IF is used for motion compensation for the block.

The binarizations in Tables 4-5 are similar except that in Table 4, when the half-Pel flag is 1, the ½-Pel precision is used. In Table 5, when the half-Pel flag is 0, the ½-Pel precision is used. Comparing Tables 3-5, the half-Pel flag is the third flag in Tables 4-5 while the half-Pel flag is the second flag in Tables 4-5. Accordingly, if the ½-Pel precision is used less frequently than the 1-Pel precision and/or the 4-Pel precision, the binarization schemes in Tables 4 and 5 can be used, for example, to improve coding efficiency.

In an embodiment, a flag indicating 1-pel precision or 4-pel precision may be modified, such as shown in Table 6. Table 6 shows an example of the binarization of the MVD precision for the normal AMVP mode.
Table 6 shows an example of the binarization of the MVD precision for the normal AMVP mode

| Binarization | AMVR Precision |
|---|---|
| 0 | ¼-Pel |
| 10 | ½-Pel (with the alternative half-pel IF) |
| 110 | 4-Pel |
| 111 | 1-Pel |

Table 6 and Table 3 are similar except that the binarization is 110 for the 4-Pel precision and the binarization is 111 for the 1-Pel precision in Table 6 while the binarization is 111 for the 4-Pel precision and the binarization is 110 for the 1-Pel precision in Table 3. Thus, the third flag being 0 indicates the usage of the 1-Pel precision in Table 3, and the third flag being 0 indicates the usage of the 4-Pel precision in Table 6.

Referring to Table 6, the half-Pel flag (e.g., the second flag) indicating whether the ½-Pel precision is used is signaled before the third flag (also referred to as an integer flag) that indicates whether the 4-Pel precision or the 1-Pel precision is used. A value of the third flag being 0 indicates that the 4-Pel precision is used. The value of the third flag being 1 indicates that the 1-Pel precision is used.

In some examples, a fixed-length coding can be used to code the multiple precisions, as described in Table 7. Referring to Table 7, two flags or bins can be used to indicate the binarization of the MVD precision. A first flag or a first bin can be used to indicate whether a fractional-pel resolution (also referred to as fractional-pel precision) (e.g., ¼-Pel or ½-Pel) is used. A second flag or a second bin that follows the first flag can indicate which fractional-pel resolution is used if the first bin indicates that the fractional-pel resolution is used or which integer-pel precision (also referred to as integer-pel resolution) is used if the first bin indicates that the integer-pel resolution is used. Table 7 shows an example of the binarization of the MVD precision for the normal AMVP mode.
Table 7 shows an example of the binarization of the MVD precision for the normal AMVP mode

| Binarization | AMVR Precision |
|---|---|
| 00 | ¼-Pel |
| 01 | ½-Pel (with the alternative half-pel IF) |
| 10 | 1-Pel |
| 11 | 4-Pel |

As described above, the coding information of the block in the current picture can be decoded from the coded video bitstream. The coding information can include the half-pel flag indicating whether the half-Pel precision is used for the component of the MVD of the block. A value of the half-pel flag can be determined based on one of: (i) at least one of a first flag and a second flag, (ii) a temporal layer identification (ID) of the current picture in a temporal layer, and (iii) block size information of the block. The first flag can indicate whether the alternative half-Pel IF is used for a left neighboring block of the block, and thus can be referred to as a first hpelIfIdx (or a first hpelIfIdx flag). The second flag can indicate whether the alternative half-Pel IF is used for a top neighboring block of the block, and thus can be referred to as a second hpelIfIdx (or a second hpelIfIdx flag). In response to the value of the flag indicating that the half-Pel precision is used for the component of the MVD, a MV for the block can be determined using the half-Pel precision. Further, a sample in the block can be reconstructed based on the MV. The left neighboring block can be adjacent to the block. The top neighboring block can be adjacent to the block.

The above and below descriptions use the half-pel flag indicating whether the half-Pel precision is used for the component of the MVD of the block as an example, and can be suitably adapted to other MVD precisions, such as the ¼-Pel precision, 1-Pel precision, and 4-Pel precision.

A context-adaptive binary arithmetic coding (CABAC) can be used to code the half-pel flag. In some examples, the half-pel flag indicating whether the AMVR half-pel precision is used can be coded with a single context model (also referred to as a context, a CABAC context, a CABAC context model). In some examples, multiple context models are available in the CABAC and one of the multiple context models can be selected to code the half-pel flag, for example, based on (i) the at least one of the first flag and the second flag, (ii) the temporal layer ID of the current picture, and (iii) the block size information of the block, as described above.

In some examples, a context model from context models (e.g., two context models) in the CABAC can be determined based on the at least one of the first flag and the second flag. Further, the value of the flag can be determined using the CABAC with the determined context model.

In some examples, one or more flags for the alternative half-pel IF can be used for context modeling in the CABAC.

In an embodiment, the first hpelIfIdx flag from the left neighboring block and/or the second hpelIfIdx flag from the top neighboring block are used to determine the context model to be used for coding (e.g., encoding or decoding) the half-pel flag indicating whether the AMVR half-pel precision is used for the block.

In an example, when a value of the first hpelIfIdx is true (e.g., a value of 1) or a value of the second hpelIfIdx is true (e.g., a value of 1), one of the two context models is used for coding the half-pel flag. Otherwise, if the value of the first hpelIfIdx and the value of the second hpelIfIdx are both false (e.g., a value of 0), another one of the two context models is used for coding the half-pel flag.

In an example, when the value of the first hpelIfIdx and the value of the second hpelIfIdx are both true, one of the two context models is used for coding the half-pel flag. Otherwise, if the value of the first hpelIfIdx is false or the value of the second hpelIfIdx is false, another one of the two context models is used for coding the half-pel flag.

In an embodiment, encoding of the half-pel flag may use a bypass coding mode without a CABAC context.

One or more flags for the alternative half-pel IF for neighboring blocks of the block can be used to determine whether to use a CABAC having a context model or a bypass coding mode to code the half-pel flag.

In an embodiment, the first hpelIfIdx flag of the left neighboring block and the second hpelIfIdx flag of the top neighboring block are used to determine whether to use a CABAC having at least one context model or a bypass coding mode for coding the half-pel flag.

In an example, when the value of the first hpelIfIdx flag is true or the value of the second hpelIfIdx flag is true, the CABAC having the at least one context model is used for coding the half-pel flag indicting the AMVR half-pel precision. Otherwise, if the value of the first hpelIfIdx flag and the value of the second hpelIfIdx flag are both false, the bypass coding mode is used for coding the half-pel flag.

In an example, when the value of the first hpelIfIdx flag is true and the value of the second hpelIfIdx flag is true, the CABAC having the at least one context model is used for coding the half-pel flag. Otherwise, if the value of the first hpelIfIdx flag or the value of the second hpelIfIdx flag is false, the bypass coding mode is used for coding the half-pel flag.

In general, whether to use a context model in a CABAC can be determined based on the at least one of the first flag (or the first hpelIfIdx flag) and the second flag (or the second hpelIfIdx flag), such as at least one value of the first hpelIfIdx flag and the second hpelIfIdx flag. In response to using the context model, the value of the half-pel flag can be determined using the CABAC with the context model. In response to not using the context model, the value of the half-pel flag can be determined using a bypass coding mode.

According to the disclosure, a context model to be used in a CABAC can be determined based on the temporal layer ID of the current picture. The value of the half-pel flag can be determined using the CABAC with the determined context model.

In an example, the context model can be one of one or more context models in the CABAC. The temporal layer ID can be one of one or more temporal layer IDs for respective one or more temporal layers that are allowed for the current picture. The temporal layer ID can correspond to the context model.

The temporal layer ID of the current picture can be used for context modeling.

In one embodiment, a value of the temporal layer ID of the current picture may be used to derive the context model to be used for coding the half-pel flag indicating whether the AMVR half-pel precision is used. When multiple temporal layers are allowed for the current picture, a separate context model can correspond to each of multiple temporal layer IDs for the multiple temporal layers. For example, context models 0, 1, and 2 can correspond to the multiple temporal layer IDs 0, 1, and 2, respectively. Accordingly, if the value of the temporal layer ID of the current picture is 0, the context model 0 is selected to be used for coding the half-pel flag. If the value of the temporal layer ID of the current picture is 1, the context model 1 is selected to be used for coding the half-pel flag. If the value of the temporal layer ID of the current picture is 2, the context model 2 is selected to be used for coding the half-pel flag.

The context model can be determined from two context models in the CABAC based on the temporal layer ID and a threshold (e.g., a threshold for the temporal layer ID).

In an embodiment, the value of the temporal layer ID of the current picture may be used to derive the context model to be used for coding the half-pel flag indicating whether the AMVR half-pel precision is used. Two context models can be selected. The threshold for the temporal layer ID can be used to determine which of the two context models to be used. In an example, when the value of the temporal layer ID is less than or equal to the threshold, one of the two context models is used. Otherwise, when the value of the temporal layer ID is greater than the threshold, another one of the two context models is used. The threshold can be any suitable value. In an example, the threshold is set to 1. In an example, the threshold is set to 2.

The context model can be determined from N context models in the CABAC based on the temporal layer ID and (N−1) thresholds. N can be less than a maximum number of allowable temporal layers having temporal layer IDs that include the temporal layer ID.

In an embodiment, the value of the temporal layer ID of the current picture may be used to derive the context model to be used for coding the half-pel flag indicating whether the AMVR half-pel precision is used. The N context models can be selected. The (N−1) thresholds may be used to check against the value of the temporal layer ID of the current picture to determine which of the N context models to be used.

The block size information of the block can be used for context modeling.

A context model can be determined from the two context models in the CABAC based on the block size information of the block and a threshold. The value of the half-pel flag can be determined using the CABAC with the determined context model. The block size information of the block can indicate at least one of (i) a width of the block (or a block width), (ii) a height of the block (or a block height), and (iii) a number of luma samples in the block (or an area of the block).

In an embodiment, a value of the block width and a value of the block height may be used to derive the context model to be used in the CABAC having the two context models for coding the half-pel flag indicating whether the AMVR half-pel precision is used. When the block width and the block height are both greater than a threshold (or a threshold value), one of the two context models may be used. Otherwise, another one of the context models may be used. The threshold value may be set to 32 luma samples.

In an embodiment, the value of the block width and the block height may be used to derive the context model to be used for coding the half-pel flag. When the block width or the block height is greater than a threshold value, one of the two context models may be used. Otherwise, another one of the context models may be used.

In an embodiment, the number of luma samples (or the area of the block) in the block may be used to derive the context model to be used for coding the half-pel flag. When the number of luma samples in the block is greater than a threshold value, one of the two context models may be used. Otherwise, another one of the context models may be used. The threshold value may be set to any suitable values or any suitable luma samples, such as 256 luma samples, 1024 luma samples, or the like.

In some examples, the coding information of the block can indicate whether an alternative ¼-Pel IF is used for the block. In response to the coding information indicating that the alternative ¼-Pel IF is used for the block, a sample in the block can be reconstructed based on the alternative ¼-Pel IF.

In some examples, the coding information of the block can indicate whether the ¼-Pel precision and the alternative ¼-Pel IF are used for the block. In response to the coding information indicating that the ¼-Pel precision and the alternative ¼-Pel IF are used for the block, a MV can be determined for the block using the ¼-Pel precision. A sample in the block can be reconstructed based on the MV and the alternative ¼-Pel IF.

When the AMVR precision is used, a flag can be signaled to indicate whether an alternative interpolation filter for other MVD precision (e.g., quarter-pel) motion compensation can be used for the block.

The alternative quarter-pel IF can be used for quarter-pel motion compensation.

In an embodiment, when the AMVR precision is used, a flag can be signaled to indicate whether the alternative quarter-pel IF is used for the motion compensation for the block.

The flag can be signaled to indicate whether the alternative ¼-Pel IF is used for the block.

The coding information can include a flag that indicates whether the alternative ¼-Pel IF is used for the block.

The alternative quarter-pel IF can have any suitable filter length or any suitable number of taps. In an example, the alternative quarter-pel IF is a 6-tap filter as shown below.
{0, 0, 128, 0, 0, 0},
{0, 20, 60, 42, 6, 0},
{−2, 14, 52, 52, 14, −2},
{0, 6, 42, 60, 20, 0}.

In an example, the alternative quarter-pel IF is a 4-tap filter as shown below.
{0, 128, 0, 0},
{20, 60, 42, 6},
{12, 52, 52, 12},
{6, 42, 60, 20}.

The alternative quarter-pel IF may be any other type, and thus is not limited by the examples above.

In an embodiment, the alternative quarter-pel IF is used and can be indicated by a flag (e.g., a quarter-pel IF flag). The quarter-pel IF flag can be signaled or derived. The quarter-pel IF flag can be propagated, for example, in the merge mode, similar to the propagation of the half-pel IF flag.

The alternative ¼-Pel IF can be determined to be used based on the coding information. A merge candidate in a merge candidate list of a neighboring block of the block can include a flag and the MV of the block where the flag can indicate that the alternative ¼-Pel IF is used.

The coding information can indicate, for example, with the quarter-pel IF flag that the alternative ¼-Pel IF is used. A merge candidate in a merge candidate list of a neighboring block of the block can include the quarter-pel IF flag and the MV of the block.

For the neighboring block of the block, the merge candidate list can be pruned based on motion information and a flag indicating whether the alternative ¼-Pel IF is used for each of at least one merge candidate in the merge candidate list where the at least one merge candidate includes the merge candidate.

In an embodiment, when the alternative quarter-pel IF is used, and the quarter-pel IF flag is propagated in the merge mode, the quarter-pel IF flag can be considered in the merge candidate pruning process, similar as described above with respect to the half-pel IF flag.

Figure 12:
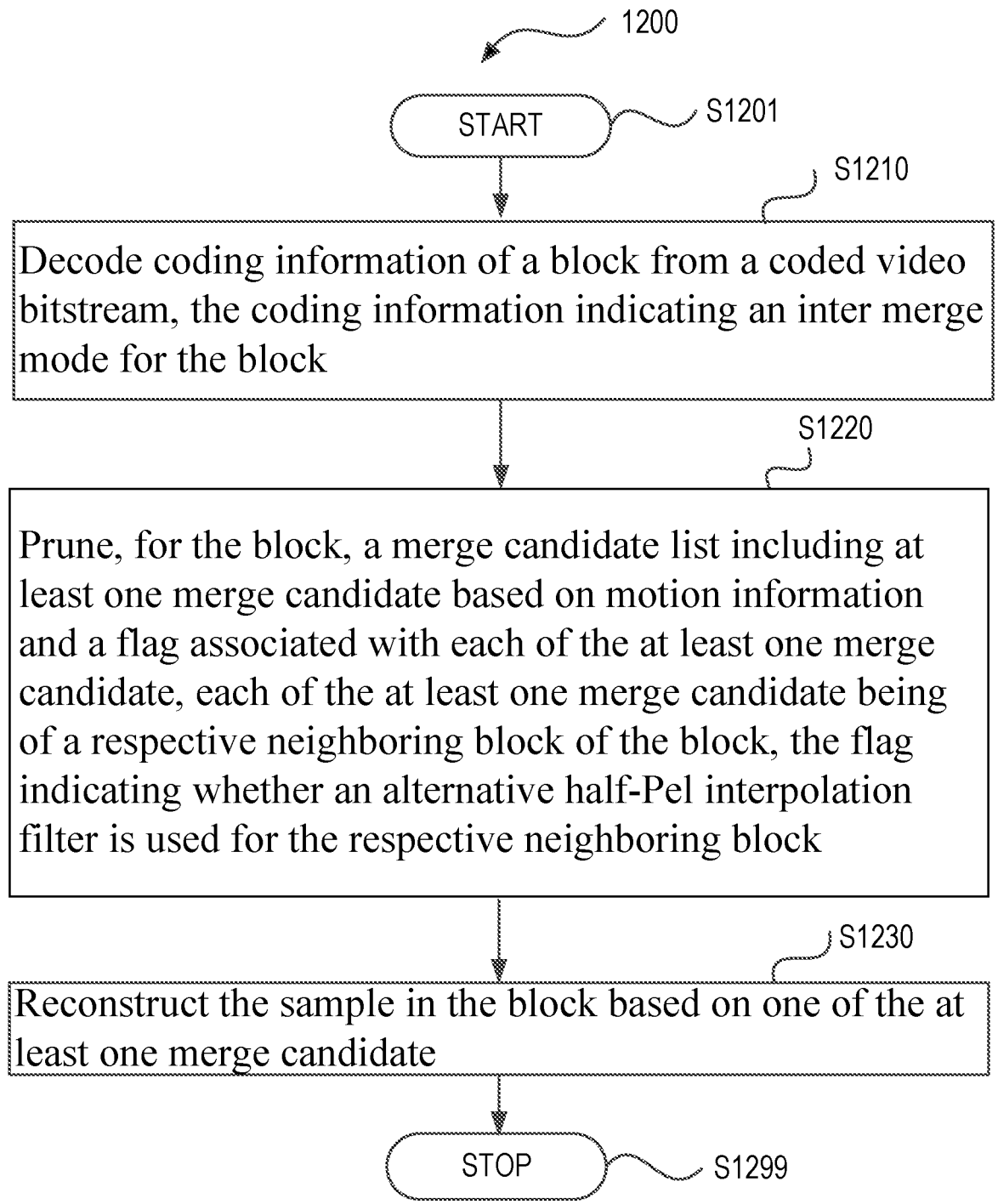
FIG. 12 shows a flow chart outlining a process (1200) according to an embodiment of the disclosure.

FIG. 12 shows a flow chart outlining a process (1200) according to an embodiment of the disclosure. The process (1200) can be used in the reconstruction of a block (e.g., a CB), so to generate a prediction block for the block under reconstruction. The term block may be interpreted as a prediction block, a coding block (CB), a coding unit (CU), or the like. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, process (1200) is implemented in software instructions, thus when the processing circuitry executes the software instructions, the processing circuitry performs the process (1200). The process starts at (S1201) and proceeds to (S1210).

At (S1210), coding information of the block can be decoded from a coded video bitstream. The coding information can indicate that the block is coded with the inter merge mode.

At (S1220), for the block, a merge candidate list including at least one merge candidate can be pruned based on motion information and a flag associated with each of the at least one merge candidate, as described above. Each of the at least one merge candidate can be of a respective neighboring block of the block. In some examples, the motion information and the flag can be of the respective neighboring block of the block. The flag can indicate whether the alternative half-Pel IF is used for the respective neighboring block.

At (S1230), a sample in the block can be reconstructed based on one of the at least one merge candidate.

The process (1200) can be suitably adapted to various scenarios and steps in the process (1200) can be adjusted accordingly. One or more of the steps in the process (1200) can be adapted, omitted, repeated, and/or combined. Any suitable order can be used to implement the process (1200). Additional step(s) can be added.

Figure 13:
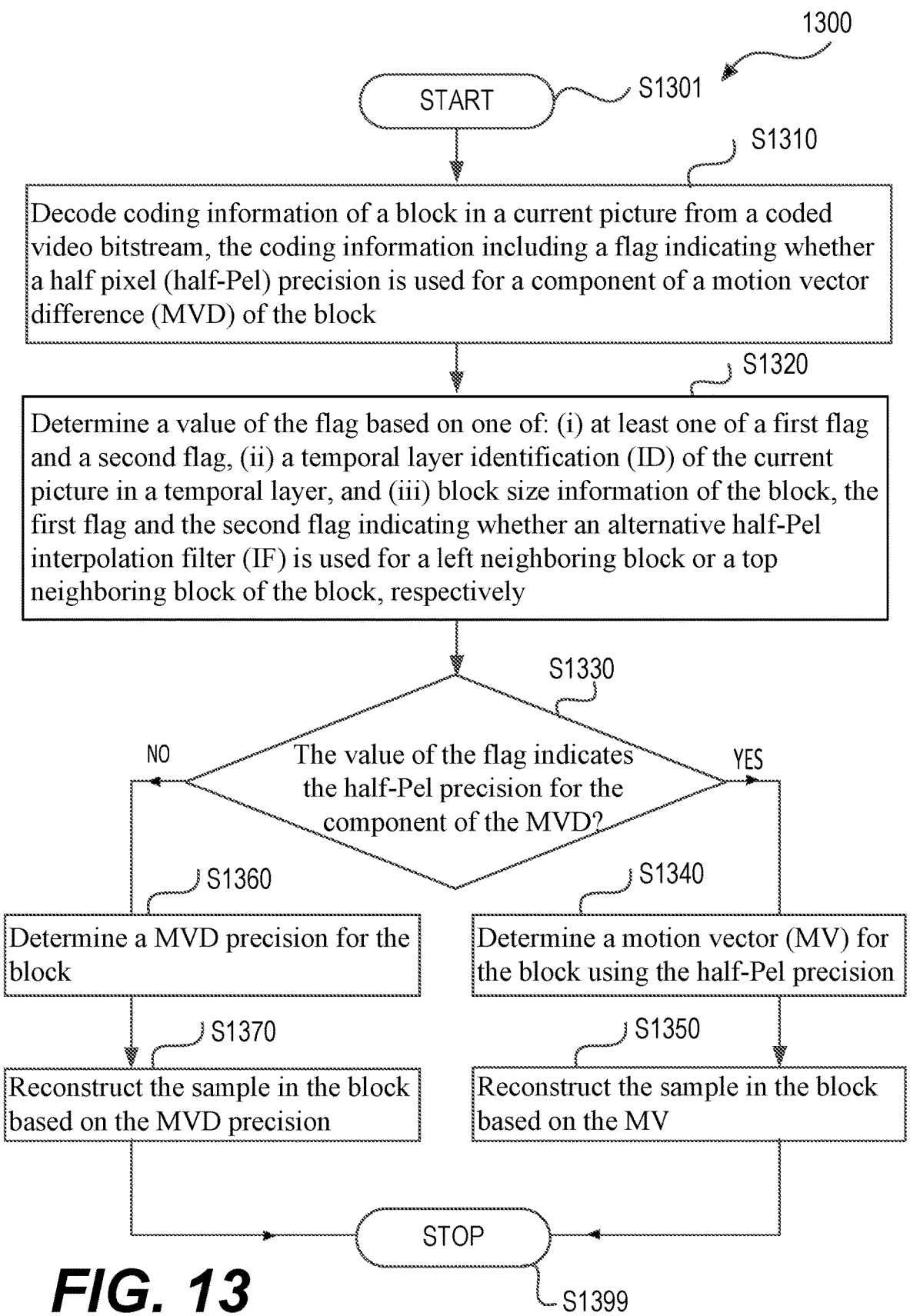
FIG. 13 shows a flow chart outlining a process (1300) according to an embodiment of the disclosure.

FIG. 13 shows a flow chart outlining a process (1300) according to an embodiment of the disclosure. The process (1300) can be used in the reconstruction of a block (e.g., a CB), so to generate a prediction block for the block under reconstruction. The term block may be interpreted as a prediction block, a coding block (CB), a coding unit (CU), or the like. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1300) is implemented in software instructions, thus when the processing circuitry executes the software instructions, the processing circuitry performs the process (1300). The process starts at (S1301) and proceeds to (S1310).

At (S1310), coding information of the block can be decoded from a coded video bitstream. The coding information can include a flag indicating whether the half-Pel precision is used for a component of a MVD of the block.

At (S1320), a value of the flag can be determined based on one of: (i) at least one of a first flag and a second flag, (ii) a temporal layer ID of the current picture in a temporal layer, and (iii) block size information of the block, as described above. The first flag can indicate whether the alternative half-Pel IF is used for a left neighboring block of the block, and the second flag can indicate whether the alternative half-Pel IF is used for a top neighboring block of the block.

At (S1330), whether the value of the flag indicates that the half-Pel precision is used for the component of the MVD can be determined. In response to the value of the flag indicating that the half-Pel precision is used for the component of the MVD, the process (1300) proceeds to (S1340). Otherwise, the process (1300) proceeds to (S1360).

At (S1340), a MV for the block can be determined using the half-Pel precision. The process (1300) proceeds to (S1350).

At (S1350), a sample in the block can be reconstructed based on the MV. The process (1300) proceeds to (S1399), and terminates.

At (S1360), a MVD precision for the block can be determined, for example, by parsing an additional flag that is signaled after the flag. The MVD precision can be the 1-Pel precision, the 4-Pel precision, or the like. The process (1300) proceeds to (S1370).

At (S1370), the sample in the block can be reconstructed based on the MVD precision. The process (1300) proceeds to (S1399), and terminates.

The process (1300) can be suitably adapted to various scenarios and steps in the process (1300) can be adjusted accordingly. One or more of the steps in the process (1300) can be adapted, omitted, repeated, and/or combined. Any suitable order can be used to implement the process (1300). Additional step(s) can be added.

Figure 14:
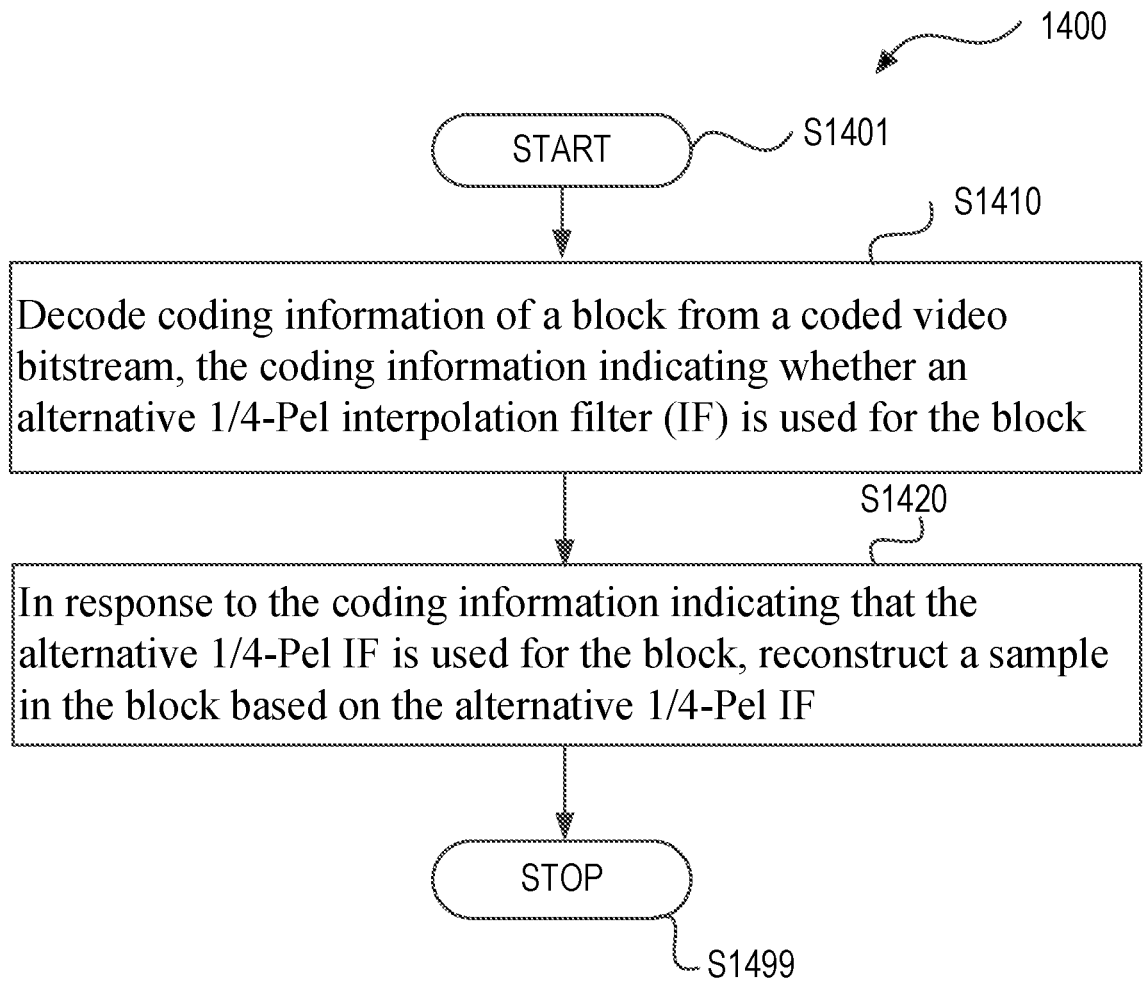
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a block (e.g., a CB), so to generate a prediction block for the block under reconstruction. The term block may be interpreted as a prediction block, a coding block (CB), a coding unit (CU), or the like. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1400) is implemented in software instructions, thus when the processing circuitry executes the software instructions, the processing circuitry performs the process (1400). The process starts at (S1401) and proceeds to (S1410).

At (S1410), coding information of the block can be decoded from a coded video bitstream. The coding information can indicate whether the alternative ¼-Pel IF is used for the block, as described above. In some examples, the coding information indicates whether the ¼-Pel precision is used for the block, as described above.

At (S1420), when the coding information indicates that the alternative ¼-Pel IF is used for the block, a sample in the block can be reconstructed based on the alternative ¼-Pel IF.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added.

In an example, when the coding information indicates that the ¼-Pel precision and the alternative ¼-Pel IF are not used for the block, a MVD precision can be determined. A MV for the block can be determined using the MVD precision.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
AMVP: Advanced MVP
HMVP: History-based MVP
MMVD: Merge with MVD
MVD: Motion vector difference
MVP: Motion vector predictor
SbTMVP: Subblock-based TMVP
TMVP: Temporal MVP
VTM: Versatile test model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding coding information of a current block in a current picture from a coded video bitstream;
determining a value of a flag indicating whether a half pixel (half-Pel) precision is used for a component of a motion vector difference (MVD) of the current block based on a temporal layer identification (ID) of the current picture in a temporal layer;
in response to the determined value of the flag indicating that the half-Pel precision is to be used for the component of the MVD,
determining a motion vector (MV) for the current block using the half-Pel precision; and
reconstructing a sample in the current block based on the MV, wherein
the determining the value of the flag comprises:
determining, based on the temporal layer ID of the current picture, a context model to be used in a CABAC; and
determining the value of the flag using the CABAC with the determined context model.

2. The method of claim 1, wherein
the determined context model is one of one or more context models in the CABAC; and
the temporal layer ID is one of one or more temporal layer IDs for respective one or more temporal layers that are allowed for the current picture, the temporal layer ID corresponding to the determined context model.

3. The method of claim 1, wherein the determining the context model further comprises:
determining the context model from two context models in the CABAC based on the temporal layer ID and a threshold.

4. The method of claim 1, wherein the determining the context model further comprises:
determining the context model from N context models in the CABAC based on the temporal layer ID and (N−1) thresholds, N being less than a maximum number of allowable temporal layers having temporal layer IDs that include the temporal layer ID.

5. The method of claim 1, wherein
multiple precisions available to be used for the component of the MVD of the current block include a quarter-pixel (¼-Pel) precision, the ½-Pel precision, a one-pixel (1-Pel) precision, and a four-pixel (4-Pel) precision; and
the flag indicating whether the ½-Pel precision is used is signaled after a flag that indicates whether the 1-Pel precision is used and after a flag that indicates whether the ¼-Pel precision is used.

6. The method of claim 1, wherein
multiple precisions available to be used for the component of the MVD of the current block include a ¼-Pel precision, the ½-Pel precision, a 1-Pel precision, and a 4-Pel precision;
the flag indicating whether the ½-Pel precision is used is signaled before a flag that indicates whether the 4-Pel precision or the 1-Pel precision is used;
a value of the flag that indicates whether the 4-Pel precision or the 1-Pel precision is used being 0 indicates that the 4-Pel precision is used; and
the value of the flag that indicates whether the 4-Pel precision or the 1-Pel precision is used being 1 indicates that the 1-Pel precision is used.

7. The method of claim 1, wherein
multiple precisions available to be used for the component of the MVD of the current block include a ¼-Pel precision, the ½-Pel precision, a 1-Pel precision, and a 4-Pel precision; and the multiple precisions are coded using a fixed-length coding having a first bin and a second bin, the first bin indicating whether a fractional precision is used.

8. A method for video decoding in a decoder, comprising:
decoding coding information of a current block in a current picture from a coded video bitstream;
determining a value of a flag indicating whether a half pixel (half-Pel) precision is used for a component of a motion vector difference (MVD) of the current block based on a temporal layer identification (ID) of the current picture in a temporal layer; and
in response to the determined value of the flag indicating that the half-Pel precision is to be used for the component of the MVD,
 determining a motion vector (MV) for the current block using the half-Pel precision; and
 reconstructing a sample in the current block based on the MV.

9. The method of claim 8, wherein
multiple precisions available to be used for the component of the MVD of the current block include a quarter-pixel (¼-Pel) precision, the ½-Pel precision, a one-pixel (1-Pel) precision, and a four-pixel (4-Pel) precision; and
the flag indicating whether the ½-Pel precision is used is signaled after a flag that indicates whether the 1-Pel precision is used and after a flag that indicates whether the ¼-Pel precision is used.

10. The method of claim 8, wherein
multiple precisions available to be used for the component of the MVD of the current block include a ¼-Pel precision, the ½-Pel precision, a 1-Pel precision, and a 4-Pel precision;
the flag indicating whether the ½-Pel precision is used is signaled before a flag that indicates whether the 4-Pel precision or the 1-Pel precision is used;
a value of the flag that indicates whether the 4-Pel precision or the 1-Pel precision is used being 0 indicates that the 4-Pel precision is used; and
the value of the flag that indicates whether the 4-Pel precision or the 1-Pel precision is used being 1 indicates that the 1-Pel precision is used.

11. The method of claim 8, wherein
multiple precisions available to be used for the component of the MVD of the current block include a ¼-Pel precision, the ½-Pel precision, a 1-Pel precision, and a 4-Pel precision; and
the multiple precisions are coded using a fixed-length coding having a first bin and a second bin, the first bin indicating whether a fractional precision is used.

12. An apparatus for video decoding, comprising:
processing circuitry configured to:
 decode coding information of a current block in a current picture from a coded video bitstream;
 determine a value of a flag indicating whether a half pixel (half-Pel) precision is used for a component of a motion vector difference (MVD) of the current block based on a temporal layer identification (ID) of the current picture in a temporal layer; and
 in response to the determined value of the flag indicating that the half-Pel precision is to be used for the component of the MVD,
  determine a motion vector (MV) for the current block using the half-Pel precision; and
  reconstruct a sample in the current block based on the MV.

13. The apparatus of claim 12, wherein
multiple precisions available to be used for the component of the MVD of the current block include a quarter-pixel (¼-Pel) precision, the ½-Pel precision, a one-pixel (1-Pel) precision, and a four-pixel (4-Pel) precision; and
the flag indicating whether the ½-Pel precision is used is signaled after a flag that indicates whether the 1-Pel precision is used and after a flag that indicates whether the ¼-Pel precision is used.

14. The apparatus of claim 12, wherein
multiple precisions available to be used for the component of the MVD of the current block include a ¼-Pel precision, the ½-Pel precision, a 1-Pel precision, and a 4-Pel precision;
the flag indicating whether the ½-Pel precision is used is signaled before a flag that indicates whether the 4-Pel precision or the 1-Pel precision is used;
a value of the flag that indicates whether the 4-Pel precision or the 1-Pel precision is used being 0 indicates that the 4-Pel precision is used; and
the value of the flag that indicates whether the 4-Pel precision or the 1-Pel precision is used being 1 indicates that the 1-Pel precision is used.

15. The apparatus of claim 12, wherein
multiple precisions available to be used for the component of the MVD of the current block include a ¼-Pel precision, the ½-Pel precision, a 1-Pel precision, and a 4-Pel precision; and
the multiple precisions are coded using a fixed-length coding having a first bin and a second bin, the first bin indicating whether a fractional precision is used.

\* \* \* \* \*